Feb. 24, 1970　　　G. H. BALDING　　　3,497,870
INTEGRATED CONTROL AND DISPLAY OF AIRCRAFT ATTITUDES
Filed April 24, 1967　　　　　　　　　　　　　　7 Sheets-Sheet 1
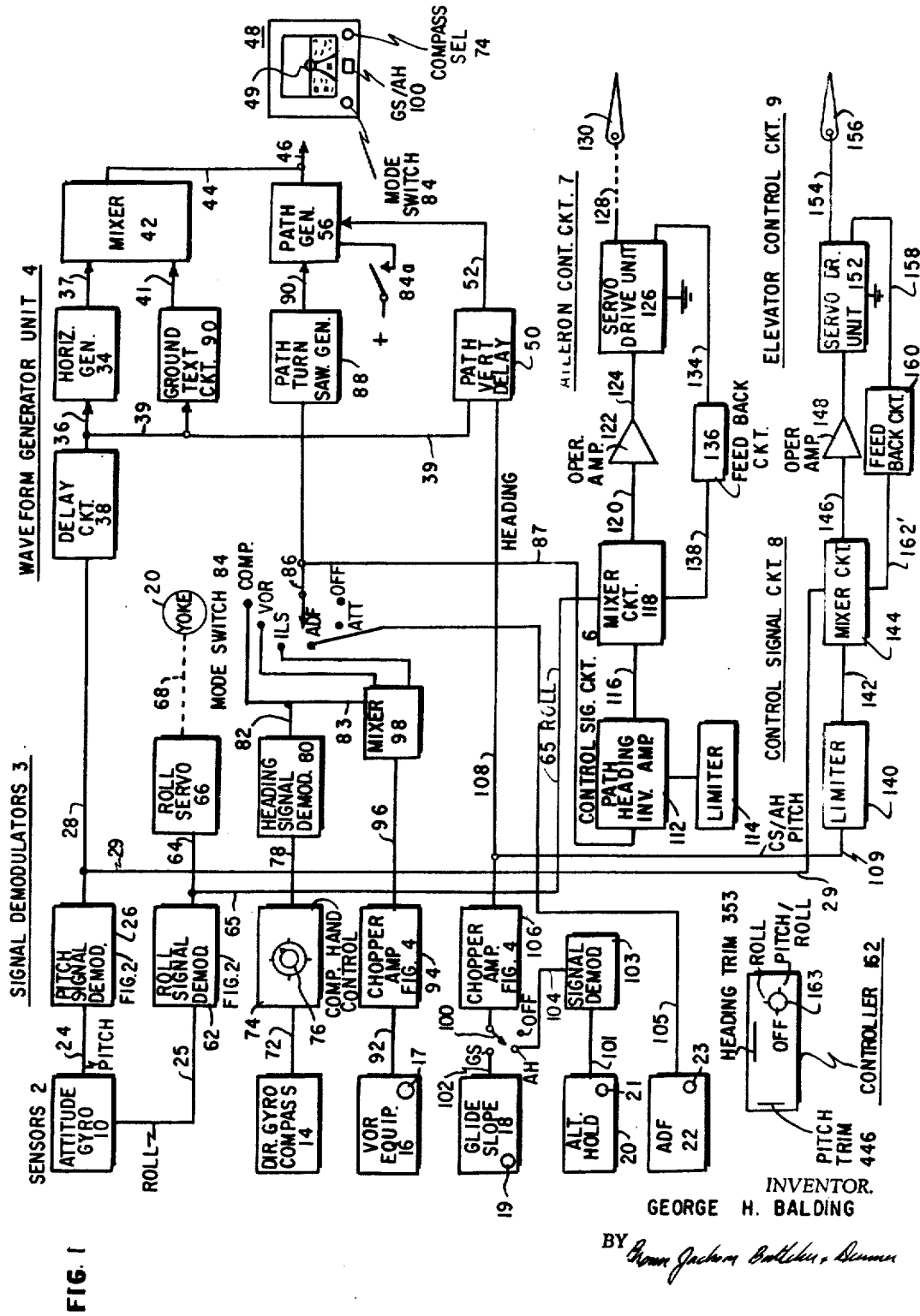
FIG. I
INVENTOR.
GEORGE H. BALDING
BY　*Brown, Jackson, Boettcher, & Dienner*
ATTYS.

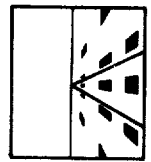

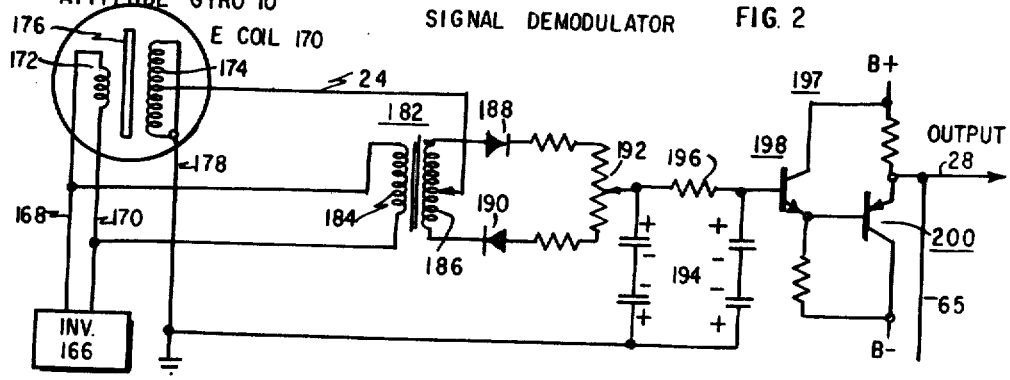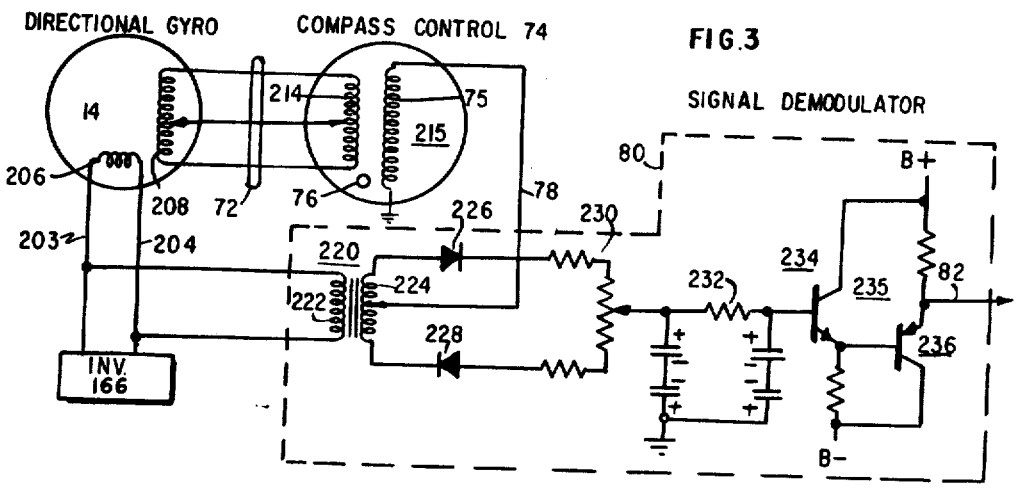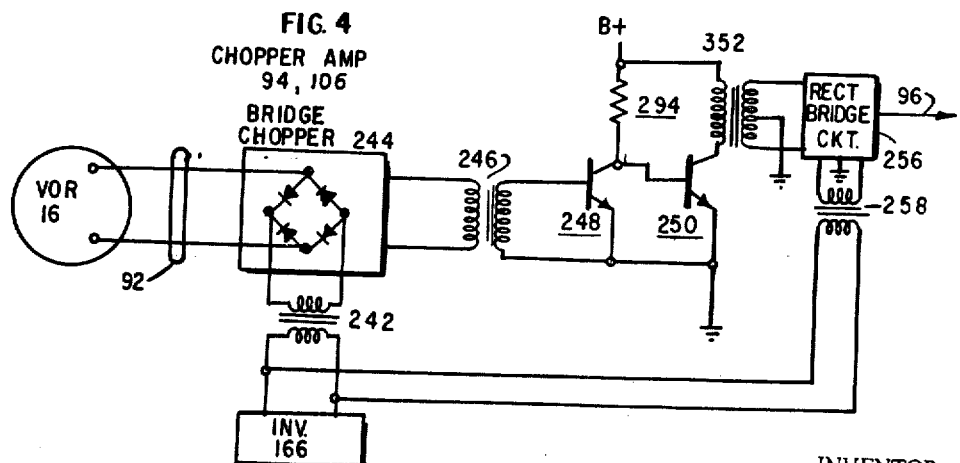

Feb. 24, 1970 G. H. BALDING 3,497,870
INTEGRATED CONTROL AND DISPLAY OF AIRCRAFT ATTITUDES
Filed April 24, 1967 7 Sheets-Sheet 7

INVENTOR.
GEORGE H. BALDING
BY
ATTYS.

United States Patent Office 3,497,870
Patented Feb. 24, 1970

3,497,870
INTEGRATED CONTROL AND DISPLAY OF AIRCRAFT ATTITUDES
George H. Balding, Los Altos, Calif., assignor to Kaiser Aerospace & Electronics Corporation, Oakland, California, a corporation of Nevada
Filed Apr. 24, 1967, Ser. No. 633,160
Int. Cl. G08g 5/00; G01c 21/00
U.S. Cl. 340—27
20 Claims

ABSTRACT OF THE DISCLOSURE

Electronic system fed by aircraft sensor signals for providing integrated control and display of aircraft attitudes in real world presentation showing command changes of position, extent of attitude change effected by controls in compliance with command, and rate of change of aircraft between actual and command positions.

BACKGROUND OF THE INVENTION

Field of invention

A novel display device known as a vertical display indicator is presently used in the field in different types of mobile equipment to provide an integrated display of the information relating to the equipment attitudes. In the embodiment of the novel vertical display indicator as used in aircraft equipment, for example, the display provides information concerning the aircraft attitudes about the pitch, roll and heading axes in a stylized display which is closely related to the pilot's picture of the real world. The display may further include command information indicating a change in attitude which is to be effected to reach a desired track or location.

In one basic embodiment, the vertical display indicator provides a first symbol, such as a horizon line, which may be banked from a horizontal position with displacement of the aircraft from a zero angle about the roll axes, and which may be displaced vertically with changes in pitch of the aircraft from zero pitch angle. The real world may be introduced into the display by the inclusion of ground symbols which move from the horizon line toward the bottom of the display with forward flight of the aircraft, and which move laterally with change in the aircraft heading. The command symbol which may be a wedge shaped path, an inverted T or other suitable form of symbol, is displaced laterally and/or vertically at one end at least to display command change of heading or pitch or both. The command symbol may also be rolled to provide command roll information.

Description of prior art

Representative types of displays which have been provided, and the circuitry and equipment for effecting electronic generation of the signals to provide same, are set forth in my U.S. Reissue Patent No. Re. 25,756, which issued April 6, 1965, U.S. Patent No. 3,118,128, which issued Jan. 14, 1964, U.S. Patent No. 3,117,300, which issued Jan. 7, 1964, U.S. application, Ser. No. 378,892, filed June 29, 1964 and U.S. application, Ser. No. 472,496, filed July 16, 1965.

SUMMARY OF INVENTION

In the present invention a novel system is provided for effecting both the attitude control of a mobile object about its pitch and roll axes in response to a command or flight mode introduced into the system, and simultaneously a dsplay to the pilot of the extent of attitude displacement being effeced in response to the command, and the rate of change of the aircraft position in its movement toward the command position. The monitoring of the resultant display by the pilot provides a continous and reliable indication of the aircraft condition at all times and makes possible the detection of malfunctions (as well as over-control and under-control of the system by the automatic equipment). With such information the pilot is able to compensate for any irregularities by merely operating the conventional controls which are equipped to override the automatic controls as necessary to effect an increase or decrease in the attitude displacement, and a corresponding increase or decrease in the rate of change being effected.

Fundamentally, such manner of integrated control-display is achieved by use of complex interacting circuit loops which may best be understood by a study of the detailed description which follows hereinafter. However, by way of brief example, one of the more basic displays incorporated in the system comprises heading selection means which are provided with a dial which permits the selection of a desired heading for the aircraft, such means including circuitry for providing an output error signal which indicates the difference between the actual heading and the heading desired. The error signal output is fed over associated circuitry arrangements to control a path generator in the system which provides a command symbol, such as a path on the display (although other types of symbols may obviously be utilized in lieu thereof), the apex of which is displaced laterally in the direction indicating the direction of roll to be effected by the aircraft to reach such heading and by an amount indicating the extent of displacement of the aircraft to be effected in reaching such heading (the degree of roll is limited to a predetermined maximum value whenever a heading change of more than 15° is to be effected). The same signal is also transmitted to a control signal circuit to effect adjustment of the aircraft ailerons and displacement of the aircraft about its roll axes in an action to bring the aircraft to the command heading. Sensor means, such as an attitude gyro sense the changed roll of the aircraft about its roll axes and provide output signals to the display means which effect banking of the roll symbol from the zero reference position on the display. The same signal output in the sensor means is also fed to the control signal circuitry for comparison with the heading signal and further control of the adjustment of the aircraft roll attitude.

With the aircraft in the banker condition, as the aircraft approaches within 15° of the selected heading the signal output from the heading selection means to the display means decreases to adjust the path toward the center of the display at a rate related to the rate of change of the aircraft heading, and simultaneously such signal to the control signal circuit effects decrease of the amount of bank effected by the aircraft. The results decrease in the aircraft bank is sensed by the aircraft gyro which in turn reduces the angle of bank of the roll symbol on the display, and simultaneously feeds a signal back to the control signal circuit indicating the reduced amount of roll angle. As such operation continues, the information as to rate of change and extent of aircraft attitude displacement is continuously provided to the pilot for monitoring purposes, whereby over-control, under-control or malfunctions are quickly detected and appropriate corrective action may be immediately taken by the pilot.

While one of the more basic loops has been described, it will be seen from the following disclosure that more complex interacting loops included in the system will effect simultaneous display of the extent of aircraft pitch and roll attitude displacements to achieve flight along selected headings, altitudes, tracks and attitudes as well as the rate of change of the aircraft in such control function, and a continuous picture of the extent of aircraft displacement about such axes to achieve such control.

It is an object of the present invention to provide a novel system which will provide monitored, automatic control of an aircraft in this improved, more reliable manner.

BRIEF DESCRIPTION OF THE DRAWINGS

With reference to the drawings,

FIGURE 1 is a block diagram of the novel integrated control display system of the present invention;

FIGURES 1A–1E set forth representative displays provided by the system for a command change of heading as indicated in the accompanying chart;

FIGURE 2 is a circuit diagram of a signal demodulator indicated in block form in FIGURE 1;

FIGURE 3 is a circuit diagram of the compass hand control unit shown in block in FIGURE 1;

FIGURE 4 is a circuit diagram of the chopper amplifiers shown in block form in FIGURE 1.

GENERAL DESCRIPTION

Figure 5:
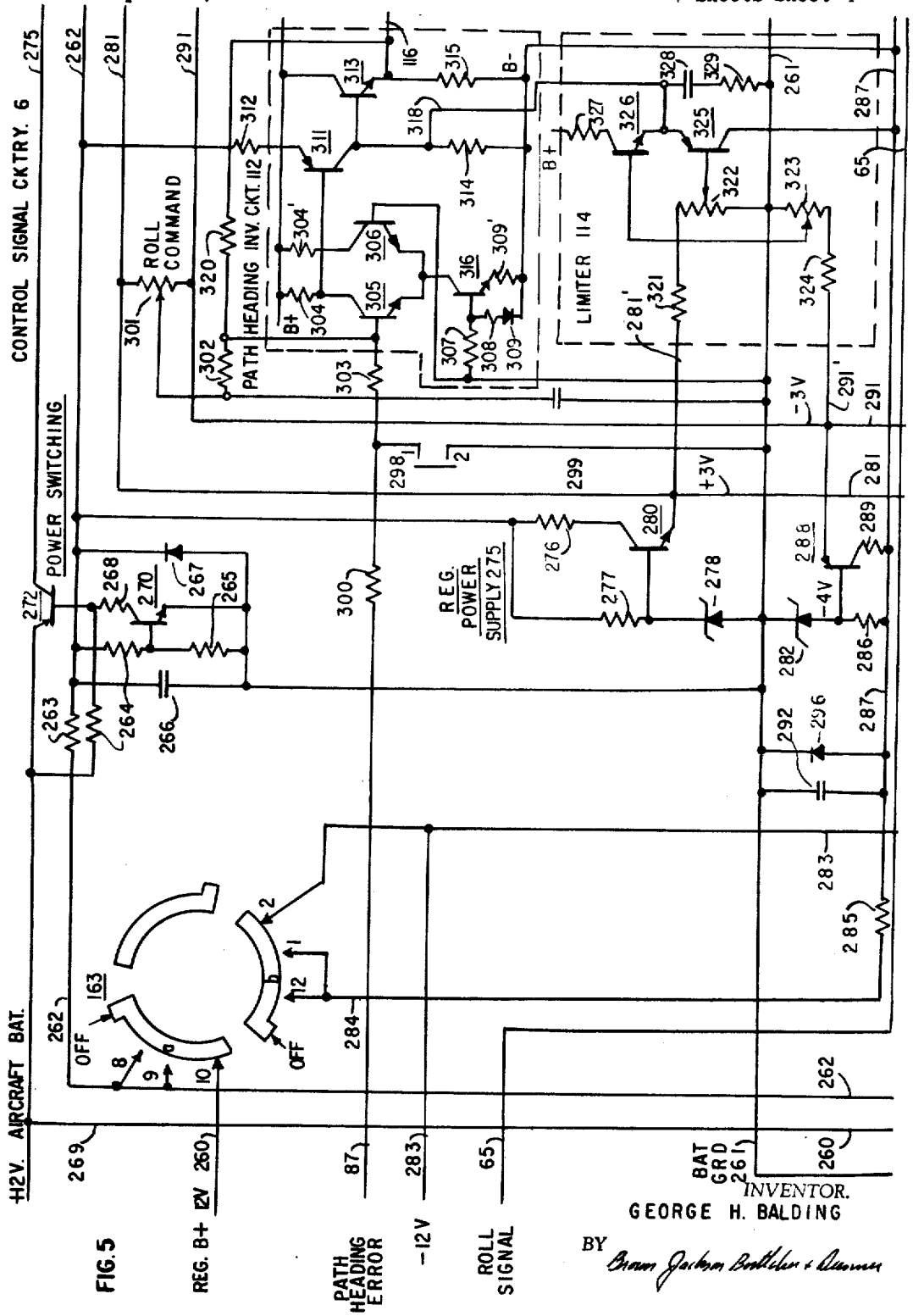
FIGURES 5–8 are circuit diagrams of the control signal circuitry used in the control of the aircraft attitude controls.

An integrated display of basic visual cues which may be provided on a display device to indicate variations in the pitch, roll and azimuth attitude of an aircraft as well as speed and altitude, if desired, is shown on the monitor 48 in FIGURE 1. Reference is made to my above identified Reissue patent and copending application for the numerous variations which are provided in the displays to achieve the desired presentation of aircraft information to the pilot.

In the display shown in FIGURE 1, the basic presentation includes a sky portion, a horizon line and a ground texture and a fixed reference symbol or reticle positioned approximately centrally of the display. The sky portion is of comparatively light intensity. The horizon line comprises a sharp narrow black line which in level flight (as shown in FIGURE 1) extends laterally across the center of the display and the fixed reticle. The ground portion of the display which extends from the dark horizon line to the bottom of the display is initially of a darker intensity, and becomes progressively lighter in intensity in the direction of the bottom marginal edge of the display. A plurality of ground texture elements emanate from the horizon line, and move across the ground texture in a semi-random pattern toward the bottom of the display to indicate movement of the aircraft relative to the ground. The ground symbols are relatively small in size adjacent the horizon and gradually increase in size in their movement across the screen in the direction of the lower marginal edge of the display.

The movement of the elements from the horizon line is at a rate which may be related to the speed of the aircraft, the elements being emitted at a first rate at the slower speeds of the plane, and at a correspondingly increased rate as the speed of the plane increases. Further, the rate of movement may be caused to increase as the symbols approach the lower edge of the display. The ground texture elements are also moved laterally across the screen, such movement being at a rate which is related to the rate of turn of the aircraft. If desired, the size of the elements and the spacing between the elements laterally and vertically may be varied to represent altitude change.

With maneuvering of the aircraft, the horizon line, sky portion and ground portion are altered on the screen in a manner to display the same changes as would be seen by the pilot in viewing the real world through his windshield. In the maneuvering of the aircraft about its roll axis, for example, with the banking of the aircraft in the execution of a turn, the horizon line is rotatably displaced from the horizontal through an angle which is consistent with the degree of bank of the aircraft, and in a direction related to the direction of turn of the aircraft. The ground texture and sky portion are rotated with the horizon line. See FIGURE 1C, 1D for example, which show a display which is viewed in a left bank of the plane.

In a similar manner, with changes in pitch of the aircraft, the horizon line must be displaced upwardly or downwardly on the display. It is apparent that as the aircraft is pitched downwardly in an increasingly steeper diving attitude, the horizon line will move progressively toward the top of the display, and the area of ground texture appearing on the display will be correspondingly increased. At such time as the plane is in a true vertical dive, the entire display would be comprised of ground texture. In a climb, the horizon line moves downwardly by an amount related to the pitch of the aircraft, and a correspondingly larger area of the display will consist of sky texture. As the aircraft turns, the ground texture elements are displaced laterally in a related manner.

The basic cues described above which provide an indication of pitch, azimuth and roll attitude including relative speed and altitude, if desired, of a mobile unit, such as an aircraft, are supplemented by a flight path display. As shown in FIGURE 1, the flight path comprises a path having a wedge-shaped outline, the marginal edges of which are sharply defined by discrete white lines. The ground texture and elements are visible below the path in the same manner as outside the path. In effect, therefore, the path comprises two white relatively narrow lines which are in the shape of an inverted V, the apex of which represents infinity. The fixed reticle permanently marked on the face of the display provides a reference point for the path apex. Other forms of path display are shown in my Reissue Patent No. Re. 25,756.

The showing of the flight path on the display will vary in accordance with the information to be displayed. Thus, as will be shown for various conditions of flight, the path apex may be at or above or below the horizon line, and may be at the center or curved to the left or the right of the reticle. The information provided to the pilot in such presentations will be described more fully hereinafter. According to the invention the novel system in addition to providing a display to the pilot of the aircraft attitudes and control of such attitudes in normal level flight, is operative in response to commands fed into the system to provide a video display of the aircraft attitude at the time of the command, a display of the selected command, a display of variations of the aircraft attitude about one or more of its axes in response to the command, a display of the degree of the attitude variations, a display of the rate of change from the existing aircraft condition to the command condition, and a display of the return of the aircraft to normal level flight (if thus selected) after the command change.

In accomplishing the novel display and control of the aircraft condition, the illustrated system is of the two axis control type which (a) effects adjustment of the aircraft ailerons 130 to accomplish the changes in roll attitude necessary to direct the aircraft to the selected course (or heading), and (b) effects adjustment of the aircraft elevators 156 to achieve the necessary adjustment of the pitch attitude of the aircraft to bring or maintain the aircraft at the desired pitch or altitude or on the selected glide slope.

DESCRIPTION OF AIRCRAFT AND DIRECTOR INTEGRATED CONTROL CIRCUITRY

A preferred embodiment of the invention shown in FIGURE 1 is adapted for use with conventional aircraft sensors including an attitude gyro 10 which provides pitch signal indications of the aircraft pitch attitude over output path 24 and roll signals indicative of the roll attitude of the aircraft over output path 25. Sensors which are operative with associated selector means which insert command information into the system, include a directional gyro 14 which provides signals over path 72 to indicate the heading of the aircraft to an associated compass hand control unit 74 which includes an adjustable selector 76 operable by the pilot to select a desired compass heading. Compass hand control unit 74 provides an error signal over path 78 which indicates the difference between the actual heading provided by the gyro compass 14 and the heading selected by dial 76 on compass hand control unit 74. Sensor equipment operative with associated selector means having command functions further includes VOR equipment 16 which includes means for selecting and sensing an omni station (or ILS station), and means for providing signals over path 92 indicative of the aircraft position relative to an omni station selected by the VOR equipment; glide slope equipment 18 for selecting and sensing a glide slope including means for providing signals over path 102 indicative of the vertical position of the aircraft relative to a predetermined path selected by the glide slope equipment; altitude hold unit 20 having means for selecting and sensing a desired altitude including means which provide signals over path 101 indicating the actual altitude of the aircraft relative to the selected altitude, and ADF equipment 22 having means for selecting a radio station, and means which provides signals over path 105 for indicating the heading to the selected station. Most or all of these sensors are conventional sensors included as standard equipment on aircraft now used in the field.

The novel system may be best understood by individually describing the various sets of information which are fed into the system, and the related display and control functions which are achieved in response thereto. Accordingly, a brief description follows of the specific portions of the system which are involved, respectively, in the display and control of aircraft pitch for normal controlled flight, and in response to the introduction of pitch-type command information including glide slope and altitude hold commands. Thereafter the description is directed to the display and control of aircraft roll effected for normal controlled flight, and also in response to the introduction of roll commands including compass heading, ILS and ADF information.

A. Pitch

As will now be shown, the novel system as connected to the aircraft sensors is operative to control the operation of the aircraft in normal level flight and also in response to selected commands, and is operative to continuously provide a video display of the aircraft attitude at the time of the command, a display of the selected command, a display of variations of the aircraft attitude about one or more of its axes in response to the command, a display of the degree of the variation, a display of the rate of change from the existing aircraft conditions to the command condition, and a display of the return of the aircraft to normal level flight (if this selected) after the command change.

(a) Pitch adjustments to maintain level flight

With reference to FIGURE 1, with the selector switch 163 on the front panel of the unit in the pitch/roll position, the system will automatically provide level flight for the aircraft, a display of the aircraft in level flight and variations of the aircraft from level flight, the degree of aircraft pitch or roll in such variation, the compensation used to return the aircraft to level flight, a display of the rate of return and the direction of compensation relative to the pitch axes, and the return to level flight.

More specifically, with the selector switch 163 set in the pitch/roll position, the output signals of the attitude gyro 10 coupled over path 24 comprise AC signals which are variable in amplitude and phase to indicate the direction of change of the aircraft pitch (up or down) and which are variable in amplitude to indicate the degree of extent of pitch change from level flight. Such signals are fed over path 24 to a signal demodulator 26 which references the signals to the output of an inverter source which supplies power to the attitude gyro 10, and provides direct current output signal over a filter circuit and impedance matching circuit to path 28 as an input to the waveform generator circuitry 4 including a delay circuit 38, a horizon generator 34, a ground texture circuit 90 and a mixer circuit 42, the output of which is connected to the electron beam gun of a display monitor 48.

With the aircraft in level flight, the horizon generator circuit 34 is responsive to the signals on path 28 to effect the display of a horizon line as shown on the monitor 48 which extends through the approximate center of the display including fixed reticle 49, and ground texture circuit 90 provides ground symbols, as shown, which move downwardly with increasing size from the horizon toward the lower marginal edge of the display. Such circuitry may be of the type set forth in my Reissue Patent Re. 25,756, or of the type set forth in my copending application, Ser. No. 472,496.

The pitch representative signals on path 28 are also fed over conductor 29 to a mixing circuit 144, for mixing with glide slope representative signals (when the glide slope/altitude switch 100 is in the glide slope position) or altitude hold signals (when switch 100 is in the altitude hold position), and transmission over path 146 to an operational amp 148 and a servo differential amp in servo drive unit 152. As will be shown, the servo differential amp provides a paraphase signal output over a pair of conductors, the signal on one path going positive and the signal on the other path going negative, the amplitude of the signals being determined by the value of the input signals (pitch representative signals only, in the present example), the polarity of the respective conductors of the pair being determined by the direction of the pitch variation from the level flight. The paraphase signals output are used to drive a servo motor which via a mechanical linkage 154 rotates elevators 156 in either direction from a zero reference point by an amount related to the amplitude of the input signal, and in a direction determined by the polarity of the pitch signals. A feedback path 158 output from servo drive unit 152 is extended over path 158, feedback network 160 and path 162' to mixer circuit 144 to balance out the pitch signal input to operational amp 148 in an operational to be more fully described hereinafter.

As will be shown in more detail hereinafter, with the selector switch 163 in the pitch/roll position, and with variations of aircraft pitch from level flight, as for example, pitch down of the aircraft by reason of a sudden air current, the output signals of the attitude gyro 10 over path 24 control the wave form generator circuitry to move the horizon line and the ground texture on the display 48 vertically by an amount related to the amount of the variation in pitch attitude of the aircraft, and simultaneously control the control signal circuit 8 and elevator control circuit 9 to effect an adjustment of elevators 156 in a direction which urges the aircraft back toward level flight. As the aircraft is pitched up in response to the changed elevator setting the attitude gyro 10 senses the changing pitch and in addition to providing a visual indication of the actual pitch of the aircraft on the video display also provides a continuous picture of the effect of the change in the elevator setting and the rate of return of aircraft to level flight. Manifestly, any failure, or even slowness, in response time will be readily detected by monitoring the integrated visual cues on the display unit, and by means of an overriding clutch in the servo drive unit 152 the pilot can hasten or slow the rate, and by continued monitoring of the display will be informed of the change effected by such action.

(b) Command pitch change

In addition to the display presentation and control provided for the aircraft pitch attitude in the pitch/roll mode, as noted above the novel system also provides means for introducing pitch commands into the system, and a display of the command introduced, the control change in the system and the aircraft change in attitude which occur in response thereto.

With reference to FIGURE 1, it will be seen that the system includes a glide slope/altitude hold switch 100. With the switch 100 operated to the glide slope and altitude hold positions, switch 84a is closed to the path generator 56 which may be of the type shown in my above identified Reissue patent or copending application, to provide a display of a flight path on the display 48 which in the absence of other input signals, will have its apex located at the fixed reticle 49. Vertical displacement of the path apex to show pitch information is effected by path vertical delay circuit 50 which provides signals of variable amplitude and polarity over path 52 to path generator 56. Lateral displacement of the path apex is provided by signals input to path turn sawtooth generator 88 which result in sawtooth outputs of variable amplitude and polarity over path 90 to the path generator 56 to adjust the path apex laterally on the display in a direction and by an amount determined by the sawtooth input on path 90. Exemplary circuits of this type are also shown in the Reissue patent and copending application above identified.

The path apex may therefore be moved to different vertical coordinates to display pitch information alone or to various coordinates to display pitch information alone or to various lateral coordinates alone to display heading/track information, or may have both coordinates change to display information pertaining to both types of information. In one of the simplest examples, the vertical coordinate of the flight path apex is moved to provide pitch and altitude information when the altitude hold unit 20 has been enabled to maintain the aircraft in level flight.

More specifically, with the switch 100 set in the altitude hold position (AH) and the selector switch 21 on the altitude hold unit 20 set at a desired altitude, DC signals over conductor 101 will indicate any departure of the aircraft from such altitude, the magnitude of the signals indicating the amount of variation and the polarity indicating the direction. Such signals are fed over signal demodulator 103, path 104 and switch 100 in the AH position, chopper amplifier 106, path 108 to the path vertical delay circuit 50 which provides direct current signals over path 109 of a polarity and amplitude to indicate the direction and extent of departure of the aircraft from the selected altitude.

Assuming the aircraft has dropped below the selected altitude, the path vertical delay circuit 50 will effect vertical displacement of the path apex above the horizon indicating that a pitch up attitude is required to return the aircraft to the desired altitude. The signals output from the altitude hold circuit which appear on path 108 are also fed over path 109 to limiter 140 (which limits the degree of pitch up which can be effected in seeking return to the selected altitude) and over path 142 for mixing mixer circuit 144 with the pitch signal on conductor 29 (which is zero in level flight). As will be explained in greater detail, elevator control circuit 9 adjusts elevators 156 to initiate a pitch up of the aircraft by an amount determined by the input signal from the altitude hold circuitry 20. As soon as the aircraft pitches up, the attitude gyro 10 provides signals over the pitch circuitry described above to cause the horizon line, ground texture and the path apex to move downwardly an amount related to the pitch change.

As the aircraft in its pitch up attitude moves closer to the selected altitude, the altitude hold circuitry 20 provides a signal of smaller amplitude, and the path vertical display circuit 50 moves the path apex closed to the horizon to show that the aircraft is now closer to the desired altitude, the rate of movement of the apex toward the horizon indicating the rate of correction of the aircraft altitude deviation. Additionally, the decreased signal output from altitude hold circuit 20 adjust the elevators 156 to a smaller angle to reduce the aircraft pitch, and the attitude gyro 10 sensing such change provides a signal which moves the horizon line and ground texture closer to the center of the display unit, the rate of movement indicating the rate of return of the aircraft to level flight. Thus, the system display, controls and sensor work in complex loops to provide an indication of deviation from a selected altitude, the degree of deviation, the degree of pitch change effected to remedy the deviation, the rate of return to the desired altitude and the rate of changes provided by the pitch correction signal, and the aircraft true pitch condition relative to the real world at all times.

B. Glide slope

The glide slope (ILS) equipment 18 as enabled by switch 19 and movement of switch 100 to the GS position provides signals which guide the plane down a predetermined glide slope to an airport runway, and in such mode the flight path apex is vertically displaced to show displacement of the aircraft from the glide slope as well as the rate of return to the glide slope, the pitch condition of the aircraft during the return, and the rate at which the aircraft is returning to zero pitch.

More specifically, with glide slope/altitude hold switch 100 in the glide slope position, signals are provided over path 102 by the glide slope equipment 18 which indicate the degree of variation of the aircraft above and below the glide slope. The glide slope signals are fed over chopper amplifier 106 and path 108 to the path vertical delay circuit 50 to effect vertical displacement of the path apex on display 48 in the manner described for altitude hold, and simultaneously the signals output from chopper amplifier 106 are fed over path 109 to limiter 140 and path 142 to mixer circuit 144 for mixing with the pitch error signal input over conductor 29. The output of mixer circuit 144 is fed to the operation amplifier 148 and servo drive unit 152 which via linkage 154 effects adjustment of the ailerons 156 to return the aircraft toward the glide slope in the manner described above relative to altitude hold. The attitude gyro 10 control senses the changing pitch and controls the display of the horizon and ground texture to indicate the extent of correction being effected, and feeds a pitch signal to the control signal circuit 8 for the elevator control circuit 9. The system works as before described to return the aircraft to the glide slope, and to control the path apex to show the rate of return to the glide slope, and to control the horizon line and ground texture to show the rate of return to zero pitch as described above.

C. Heading display

As noted above, the horizontal coordinate of the path apex is adjusted to provide information relating to heading or track information for different modes of operation of the aircraft. A mode switch 84 has a plurality of positions including a compass position, a VOR position, an ILS position, an ADF position, and an off position. In any one of the positions (other than off) the path generator 56 is enabled to generate a flight path on display 48 and heading error signals from the equipment selected by the position of mode switch 84 are fed over path 86 to path turn sawtooth generator which determines the horizontal coordinate of the path apex by signals input to path generator 56 over path 90. The heading error signals on path 86 are also fed over path 87 to control signal circuit 6 and aileron control circuit 7 to adjust the ailerons 130 in a control function to be described.

(1) VOR display

With the VOR equipment 16 enabled and mode switch 84 in the VOR position, the flight path is laterally displaced to show lateral displacement of the aircraft from the VOR track and the manner in which the system effects banking of the aircraft to return the aircraft to the desired track, the degree of banking, the rate of return to the desired track, the rate of change of the bank, the return to the desired track, and the leveling off of the aircraft as the aircraft approaches the desired track.

More specifically, the signals output from the VOR equipment 16 and the heading signal demodulator 80 (the compass hand control dial 76 having been set at the same position as the VOR dial 17) as mixed in mixer 98 provide signals which represent the heading the aircraft should follow to reach the selected track with a critical angle of 45° in one embodiment. The signal output from mixer 98 is extended over mode switch 84 in the VOR position and path 86 to path turn sawtooth generator 88 which via path 90 controls path generator 56 to displace the path apex to the left or right by an amount related to the extent of aircraft deviation from the track. The signals on path 86 are also fed over path 87 to enable servo drive unit 126 which via linkage 128 adjusts ailerons 130 to effect banking of the aircraft. A feedback signal indicating the extent of adjustment of ailerons 130 is provided over path 134, feedback circuit 136 and path 138 to mixer circuit 118.

As the ailerons 136 are moved and the aircraft is banked (or rolled) displacement of the aircraft about its roll axis is sensed by attitude gyro 10 which provides a corresponding change in roll signal output over conductor 25, the phase of the signal being varied in accordance with the direction of rotation of the aircraft about the roll axis and the magnitude of the signal being varied with the value of the roll angle. The roll signal is fed to a signal demodulator 62 which is similar to signal demodulator 26 in the pitch path, and the signal is converted to positive, negative DC signals, the magnitude of which indicates the degree of displacement, and the polarity of which indicates the direction of displacement of the aircraft about the roll axis. The signal is then filtered and fed over impedance matching circuit to path 64 to roll servo motor 66 which via mechanical means 68 (not shown) adjusts the yoke 20 on the neck of the tube of display monitor 48 to effect a corresponding rotation of the display on the monitor. The signal output from demodulator 62 is also fed overpath 65 to mixer circuit 118 for mixing with the heading signal on path 116 and feedback signal on path 138 to control ailerons 130 to return to their normal position as the plane reaches the desired degree of bank.

As the aircraft turns in the direction of the desired heading (and assuming only a minor deviation) the output signal from the VOR equipment 16 and the heading signal demodulation, mixer 98 and mode switch 84 to the path sawtooth generator 88 is decreased and the path apex is adjusted toward the display center. Additionally the ailerons 130 are controlled to reduce the roll attitude, and the attitude gyro 10 controls the roll servo 66 to reduce the bank display. The rate of return of the aircraft to the VOR track is thus shown by the rate of return of the path apex toward the center, and the amount of correction being provided by the system is indicated by the rate of change in the roll attitude of the plane.

(2) ILS

With mode switch 84 in the ILS position and switch 100 in the glide slope position, the system will operate to simultaneously provide information which effects adjustment of both the horizontal and vertical coordinates of the path apex by signals input over path 86 to the path sawtooth generator 88 from the VOR equipment 16 and heading signal demodulator 80 over mixer 98 and mode switch 84 in the ILS position as well as by the signals input over path 108 to the path vertical delay circuit 50 from the glide slope circuit 18, the manner of display and system operation being apparent from the foregoing description.

(3) Compass hand control

The novel system also includes compass hand control circuit 74 for selecting a desired heading of flight for the aircraft, which is automatically maintained by the system, and simultaneously monitored by presenting any deviation of the aircraft from such heading as well as the corrective action being taken by the system circuit includes the banked attitude of the plane and its rate of change during such correction, and the rate at which the return to heading is being effected.

For this purpose, the system includes a hand control compass selector 76 which is adjustable by the pilot through a range of 360°, the particular setting upon which the selector is located indicating the heading or VOR/ILS track which is to be flown by the aircraft. Directional gyro compass 14 provides signals indicating the aircraft heading over path 72 to the compass selector 74 which compares the deviation of the actual heading from the selected heading, and provides signals output over conductor 78 to a heading signal demodulator circuit 80 which are variable in phase and amplitude, the amplitude indicating the amount of difference in the actual and selected heading, and the phase indicating the direction of the actual heading from the desired heading.

In response to the AC input signals, signal demodulator 80 provides a DC signal output having an amplitude related to the difference value and a polarity related to the direction, which signals are filtered and coupled over an impedance matching circuit to path 82 and mode switch 84 and also over path 83 to mixer 98.

Assuming the mode switch 84 is in the compass position, the DC heading deviation representative signals are coupled over conductor 86 to path turn sawtooth generator 88 which controls path generator 56 in its generation of the wedge-shaped flight path which normally has its apex located at the center reticle 49.

With deviation of the aircraft to the left of the selected course, for example, the heading error signal over path 86 to path turn sawtooth generator 88 results in generation of a sawtooth which adjusts the path apex laterally from the center in a direction which indicates the direction of flight required to return the aircraft to the heading selected and by an amount related to the extent of deviation.

If, for example, the aircraft is on a heading to the left of the selected heading, a corrective measure requires banking of the plane to the right. The signals on path 86 which effect such change in the display are also fed over path 87 to control signal circuit 6 and aileron control circuit 7 to effect adjustment of the aircraft aileron 130 to a position which controls banking of the aircraft to the right to bring the aircraft toward the selected heading. As the plane banks, the attitude gyro detects the aircraft displacement about the roll axis, and effects rotation of the display presentation to indicate the degree of bank. As the plane turns toward the right, the heading signal error provided by the compass hand control decreases and the path will move toward the center, the rate of return and the degree of bank indicating the amount of compensation being effected. As the path approaches the desired heading, and the heading error decreases, the control signal circuit 6 and aileron control circuit 7 return the plane toward level flight. The roll gyro senses the changing bank and adjusts the display roll toward the level flight display, and path sawtooth generator causes the apex to return closer to the display center.

Mode switch 84 is also adjustable to an ADF position wherein the novel system directs the aircraft toward an ADF station selected by dial 23 on the ADF equipment 22. The error signals output from ADF equipment 22 are fed over path 105 and mode switch 84 to path 86 to effect operation of the system in the manner disclosed relative to the compass heading input.

In addition to continually providing information relative to aircraft condition about its roll, pitch and heading axes, command information requesting a change or deviation, information indicating the extent of deviation effected, information indicating the corrective action and rate of change of deviation and the corrections, etc., there is the further advantage that the display provides a visual safeguard relative to malfunctioning of the control system. That is, by way of example, if the aircraft remains in level flight with the path displaced from the center position, the pilot is immediately made aware of a fault in the controller circuitry, and corrective action may be quickly taken by the pilot. Likewise if the horizon line remains in the center of the display, and the path apex is vertically displaced, the pilot will quickly recognize a malfunction. Other safeguards inherent in such presentation will be obvious to those skilled in the art.

CIRCUIT DESCRIPTION

(a) Signal demodulator

A preferred embodiment of the signal demodulators, such as demodulators 26, 62, 80, 103 of the block circuitry of FIGURE 1, is shown in FIGURE 2. For purposes of example, signal demodulator 26 which is connected over path 24 to attitude gyro 10 is described. The manner in which the modulators 62, 80, 103 are connected and are responsive to the roll signal output of attitude gyro 10, the heading error signal output of compass hand control 74 and the altitude error signal from altitude hold unit 20, respectively, will be apparent from such description.

With reference to FIGURE 2, attitude gyro 10 has a first input which is connected over conductors 168, 170 to a 400 cycle aircraft inverter 166, the AC signal output of which is coupled over conductors 168, 170 to the primary winding 172 of an E-coil differential transformer 170 which has an adjustable slug 176 located between the primary winding 172 and a secondary winding 174. The slug is adjusted so that with the aircraft in level flight, a zero output signal appears on path 24, and with pitch down of the aircraft an AC signal is provided over path 24 which has a first predetermined phase relation to the input signals on conductors 168, 170 and a magnitude determined by the degree of displacement of the aircraft relative to its pitch axes. With pitch up of the aircraft, AC signals having a second phase which is displaced by 180 degrees from the first phase are provided over path 24, the magnitude of the signal again being determined by the degree of aircraft displacement relative to its pitch axis. The signals on path 24 are coupled to the mid point of the secondary winding 186 on an input transformer 182, the primary winding 184 of which is connected across source conductors 168 and 170 whereby the signals fed over path 24 to the secondary 186 are referenced to the signals fed over the primary 186 from source 166.

The terminal ends of secondary winding 186 are coupled via inversely poled diodes 188, 290 to a resistor network including adjustable resistance 192, and an RC filter circuit 194, 196 to an impedance matching circuit 197 which includes NPN transistor 198 and PNP transistor 200 connected in tandem as emitter followers to provide temperature compensation in a known mode of operation.

With a signal input over path 24 of one phase (pitch down condition, for example), a DC signal of one polarity is provided as an input to transistor 198. With pitch up of the aircraft a signal input of the other phase is provided over path 24, and a DC signal of a different polarity is provided to transistor 198. The magnitude of the DC signals in each case is determined by the magnitude of the AC signals on path 24, which are in turn determined by the degree of pitch up or pitch down of the aircraft. The DC signal output of the impedance matching circuit is fed over path 28 as more fully described hereinafter.

The signal demodulator 62, altitude hold signal demodulator 103 and heading signal demodulator 80 are similarly constructed and are operative in a similar manner.

(b) Compass hand control

As described above, the novel system also includes a mode switch 84 (FIG. 1) having a position (Comp) for selecting aircraft flight along a particular heading which may in turn be selected by selector dial 76 on compass hand control unit 74. With adjustment of the dial 76 to select a heading, and with variation of the aircraft from the heading thus selected, the system automatically provides a display of the degree of variation of the aircraft from the selected heading, effects adjustment of the aircraft ailerons to return the aircraft toward the selected heading, displays the degree of bank of the aircraft in seeking return to the heading, the movement which effects the return, and rate of such return including return to heading and level flight.

To accomplish such operation, the compass hand control 74 as shown in FIGURE 3 includes a dial 76 which is adjustable over an associate dial (not shown) which is divided into fine degree increments. Compass hand control further includes an adjustable control transformer 215 having a primary winding 214 connected over a three wire path 72 to output winding 208 of directional gyro 14 and a rotor 75 which is rotated by dial 76 in its movement. The input winding 206 of directional gyro 14 is coupled over conductors 203, 204 to an inverter source 166. The directional gyro 14 is operative to provide AC signals over output winding 208 to transformer 215 which indicate the command heading of the aircraft.

With adjustment of dial 76 on hand compass control 74 to select the desired heading, and zero difference between the heading selected by dial 76 and the actual heading indicated by gyro 14 over path 72, zero output is provided over path 78 by rotor 75. With a difference in the selected heading and the actual heading, an AC output signal is provided by rotor 75 over path 78, the phase of which as compared with the source current, indicates the direction of deviation, and the magnitude of which indicates the extent of deviation of the aircraft heading from the selected heading.

The signals output from hand control 74 on path 78 are coupled to the mid point of the secondary winding 224 of transformer 220 in signal demodulator 80. Transformer 220 includes a primary winding 222 connected to source conductors 203, 204. The end terminals of winding 224 are connected over oppositely poled rectifiers 226, 228, a resistor network including adjustable resistor 230 and an RC filter network 232 to impedance matching circuit 235 which includes tandem connected transistors 234, 236, and to output conductor 82 and mode switch 84.

Signal demodulator 80 operates in the manner of signal demodulator 26 as described heretofore, to provide a DC signal output which varies in polarity in accordance with the direction of deviation of the actual heading from the selected heading, and which varies in magnitude in accordance with the degree of variation of the actual heading from the selected heading. The manner in which the output signals of demodulator 80 are fed over conductor 82 and mode switch 84 to the path turn sawtooth generator 88 to effect corresponding lateral adjustment of the path apex on the display, and simultaneously over path 87 to the control signal circuit 6 and aileron control circuitry 7 to affect a corrective adjustment of the aileron 130 are more fully described hereinafter.

(c) Chopper amplifier

One preferred embodiment of a chopper amplifier for use with the VOR equipment 16, glide slope equipment 18, and altitude hold equipment 20 is shown in FIGURE 4.

The chopper amplifier is shown in FIGURE 4 as connected to the output of VOR equipment 16 which is normally in the order of 250 millivolts and which is fed to two input terminals of a bridge chopper 244 which is also supplied with AC power by a transformer 242 which is connected to an inverter 166. The output of the bridge chopper 244 is coupled over transformer 246 to an impedance matching AC amplifier circuit 249 which includes a first and a second transistor 248, 250. The output of amplifier circuit 249 is coupled over transformer 252 to a rectifier bridge circuit 256 which has a second input connected over transformer 258 to inverter 240. With the receipt by rectifier bridge circuit 256 of AC signals of varying phases fed over transformer 252 to indicate the direction of variation of the aircraft from the selected station, and of a magnitude related to the amount of deviation, and AC signals from inverter 166 over transformer 242, the rectifier bridge circuit 256 provides a plus-minus DC output voltage over output path 96 which has a value directly related to the VOR signal on path 92 and a polarity related to the direction of aircraft deviation from the VOR track.

(d) Control signal circuit 6 and aileron control circuit 7

Control signal circuitry 6 (FIGURES 1, 5, 6) which is fed by the path heading error signals over input 87 and roll signals over input 65 basically comprises a path heading inverter amplifier 112 connected to heading error input 87, a limiter 114, and mixed circuit 118 connected to mix the roll signals on input 65 and the heading error signals from amplifier 112 with feedback signals on conductor 134, and to transmit such signals over output circuit 120 to the aileron control circuitry 7.

The aileron control circuit 7 basically comprises an operational amplifier 122, servo drive circuit 126 which includes a servo differential amplifier 365, a servo driver amplifier 366 and a servo bridge circuit 372 which operate a motor actuator 382 connected via mechanical linkage 128 to the aircraft ailerons 130; and a feedback circuit including potentiometer 383 which is driven by linkage 129 to provide signals over feedback path 134 to mixer circuit 118 indicating the position of the ailerons thereto.

Figure 6:
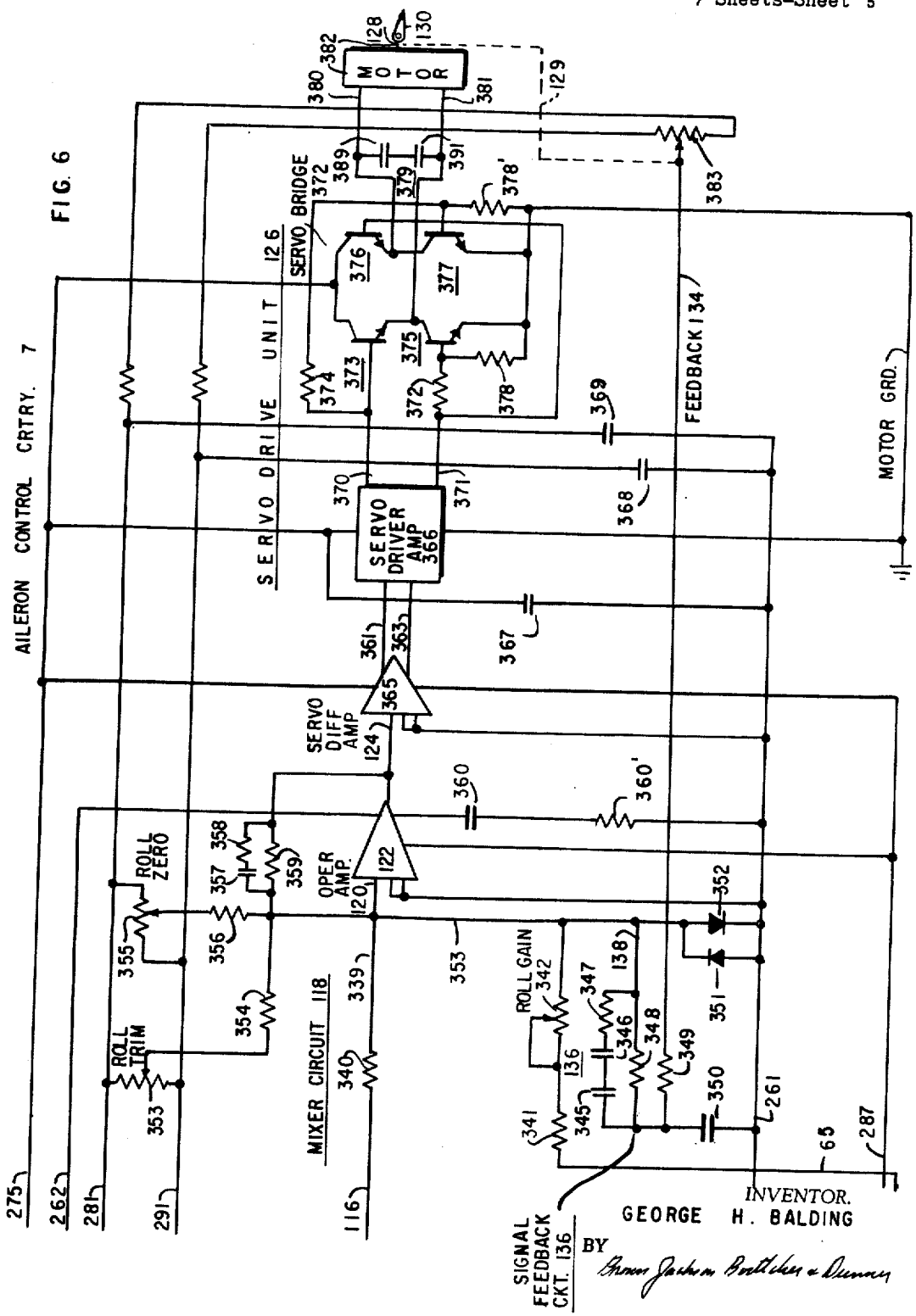

A control switch 163 located on the face of the controller cabinet (FIGURE 1) has a first deck S1A (FIGURE 5) for connecting power to control signal circuitry 6 and aileron control circuit 7 and a second deck S1B (FIGURE 7) for connecting power to control signal circuit 8 and elevator control circuitry 9. As shown in FIGURE 5, operation of switch 163 from the off position to the pitch/roll position will close contacts 1, 5, 9 on deck S1A. With closure of contacts 9, power is supplied from B+ on conductor 260 over terminal 10, segment $a$, and contact 9 to conductor 262. System ground is supplied to the control circuitry over conductor 261, as shown.

With operations of switch 163, B+ battery on conductor 262 via resistor voltage dividers 263, 264, 265 provides a positive signal to the base of switching transistor 270 which turns on, and via resistor 268 turns on power transistor 272. Filter capacitor 262 is connected between B+ conductor 262 and ground 261, and diode 267 is connected via transistors 270 to provide protection therefor in the event B+ and B− inadvertently connected incorrectly.

As transistor 272 is turned on, +12 volts from the aircraft battery on conductor 269 is connected over transistor 272 to conductor 275 for the system.

With selector switch 163 in the pitch roll position deck S1A at contact 1 extends −12 volt potential over wafer segment $b$, contact 1, conductor 284, and resistor 285 and conductor 287 to one side of a regulated power supply 375. Conductor 262 which has +12 volts connected thereto is connected to the opposite side of the regulated power supply 275.

Regulated power supply 275

Regulated power supply 275 basically comprises an NPN transistor 280 and a PNP transistor 288 connected across conductors 262, 281; 287, 261 as emitter followers to provide +3 and −3 volts over conductors 281, 281′, and 291, 291′ respectively. Zener diodes 278, 282 connected to the base circuits of transistors 280, 288 operate to maintain a stable voltage output from transistors 280, 288 with voltage changes of the aircraft source. As will be shown the +3 and −3 volt supply is connected via conductors 281, 281′, 291, 291′ to the roll command potentiometer 301, the roll trim potentiometer 353, the roll zero potentiometer 355, feedback potentiometer 383, and pitch trim potentiometer 446 and pitch zero potentiometer 434 which comprise adjustment means for the controller equipment 162 (FIGURE 1).

Heading inverter amplifier 112

The path heading error signals provided over conductor 87 (FIGURE 5) to control signal circuitry 6 from the mode switch 84 (FIGURE 1) are fed over resistor 300 (assuming switch 298 in the open position illustrated) and over resistor 303 to the input for one transistor 305 of a transistor pair 305, 306 which are connected as an operational amplifier with common emitters fed by constant current transistor 310 and with a feedback circuit over resistor 320 to the base of transistor 305 to set up the gain for the amplifier 112. The base of transistor 306 of the pair is connected to battery ground on conductor 261 for reference purposes. The base of constant current supply transistor 310 for the operational amplifier is connected over resistor 307 to ground, and over resistor 308 and diode 309 to B− potential on conductor 287. The emitter of transistor 310 is connected over resistor 309′ to ground. The base of transistor 305 is biased by a signal which is determined by the setting of adjustable roll command resistor 301 and supplied over resistor 302 to the base of transistor 305. A filter capacitor 299 is connected between the junction of resistors 301, 302 and ground.

The input signals provided over conductor 87 which indicates path heading error are amplified by transistors 305, 306 in a conventional operational amplifier mode, and fed to a further amplifier stage comprising transistor 311 and emitter follower 313 to output conductor 116 and mixer circuit 118. Transistor 311 operates as an amplifier and an inverter, and transistor 313 is used to match the load impedance. With a zero path heading error signal on path 87, the output on conductor 116 from amplifier 112 will be zero volts. Changes in the heading error input in the positive and negative directions from zero volts results in amplified signal outputs over conductor 116 of corresponding opposite polarities, the magnitude of the signal output as will be shown determining the extent of aileron adjustment to be effected and the polarity of which determines the direction.

Limiter 114

The collector of amplifier stage 311 in amplifier 112 is also connected over conductor 318 to limiter circuit 114, which is operative to limit the value of the output signal over conductor 116 and thereby the amount of aileron displacement which may be obtained in response to any value heading error signal input to the system. In the present arrangement, the limiter circuitry 114 is adjusted to limit the output signal over conductor 116 to a value which effects a maximum aircraft roll of twenty degrees.

As shown in FIGURE 5, the limiter includes an NPN transistor 326 and a PNP transistor 325 having a common emitter circuit connected over a conductor 318 to the output of amplifier 311. The collector of transistor 326 is connected over resistor 327 to B+ on conductor 262, and the base is connected to adjustable resistor 323 in a resistor network 321, 322, which is in turn connected across the supply conductor 281 of regulated power supply 275 (+3 v.). The base of transistor 325 is connected to adjustable resistor 322 in the resistor network 323, 324 which is connected between −3 v. regulated supply conductor 291′ and ground. RC network 328, 329 comprises a roll off circuit to prevent oscillation at high frequencies of amplifier circuit 112.

In operation, assuming by way of example that adjustable resistor 323 is set so that transistor 326 conducts at −2 volts on conductor 318, the transistor 326 will be normally off if the voltage at the common emitter circuit is less than −2 volts. In the event that the voltage at the common emitter goes to −2 volts, transistor 326 conducts and acts as a variable resistor to maintain the emitter voltage at −2 volts. Assuming the transistor 325 is set by adjustable resistor 322 to conduct at +2 volts output, it will be seen that as the voltage output at the common emitter goes to +2 volts, transistor 325 conducts and acts to limit the signal output from amplifier 311 to such value.

Mixer circuit 118

Mixer circuit 118 has a first signal input connected thereto over conductor 116 from the path heading inverter amplifier 112, which signal varies in amplitude with the magnitude of the path heading error signal (as limited by limiter 114) and which varies in polarity with the direction of the error; a second signal input over conductor 65 which indicates the roll attitude of the aircraft when displaced from level flight, the amplitude of the signal input indicating the magnitude of the roll displacement and the polarity indicating the direction of roll displacement, and a third input over feedback circuit 134 which has a polarity which indicates the direction of displacement of the aileron from zero position and a magnitude which indicates the amount of displacement.

The path heading error signal on conductor 116 is fed over resistor 340 to the common output conductor 120 for the mixer circuit 118. The roll signal input on conductor 65 is fed over resistor 341 and adjustable roll gain resistor 342 to mixer output conductor 120. Adjustment of roll gain potentiometer 342 to different positions adjusts the sensitivity of the circuit (i.e., rate of return) in returning the aircraft from a banked attitude to level flight.

The feedback circuit 134 which provides the signals indicating the aileron position is connected via conductor 134 from the output of the servo circuitry 126 over RC network 349, 350, and feedback circuit 136 which includes series capacitors 345, 346 and resistor 347 connected in parallel with resistor 348 to output conductor 120. RC circuit 349, 350 is operative to filter out the high frequency signals which might otherwise be introduced into the feedback circuit. The values of the components of the feedback circuit 136 determine the rate of roll adjustment for the aircraft, the values being carefully selected in a preferred embodiment to effect a roll rate of approximately 5–10 degrees of roll per second.

Diodes 351, 352 connected in inverse parallel relationship between mixer output conductor 120 and ground, limit the signal input to the operational amplifier 122 from exceeding a given value for the positive and negative directions. The diodes are particularly effective during the period in which the control signal circuitry is turned off. That is, the roll signals on conductor 65 are continuously supplied over mixer circuit 118 and conductor 120 to operational amplifier 122. During the period the unit 162 is turned off, there is no feedback signal over resistor 359, and accordingly limiter means 351, 352 are provided to prevent damage to the input transistor of operational ampifier 122 by the roll signals. The diodes are also effective to prevent the operational amplifier 122 from being locked up due to extreme input voltages.

Mixer output conductor 120 is also connected via resistors 354 to roll trim potentiometer 353 which is available to the pilot externally of the circuitry housing for adjustment purposes, and over resistor 356 to roll zero potentiometer 355 which is located internally of the system and is available for adjustment only by the service personnel. The purpose of both potentiometers is to adjust the system to trim the aircraft to a true zero level.

The mixed signals on mixer output conductor 120 are fed to operational amplifier 122, the output of which is connected over conductor 124 to the servo differential amplifier 365. An RC circuit 360, 369′ connected to output conductor 124, operates as a high frequency roll-off in the megacycle region, and an RC circuit 357, 358 connected to output conductor 124 operates as a low frequency roll-off in the hundred cycle region. The resistor 359 connected in parallel with RC circuit 357, 358 provides a feedback path to the input of operational amplifier 122 and sets the gain of the amplifier.

Servo drive unit 126

The servo drive unit 126 includes a servo differential amplifier circuit 365 which has an input connected over conductor 124 to the output of operational amplifier 122 and circuitry connected to provide a paraphase output over conductors 361, 363 to servo drive amplifier 366. The servo differential amplifier 365 is similar in structure to operational amplifier 122 with the exception that the first output lead 361 is connected to the collector of the transistor, which is likened to transistor 305 in amplifier 122 and the second output lead 363 is connected to the collector of the transistor which is likened to transistor 30 in amplifier 122 so that when the signal on conductor 361 goes positive, the signal on conductor 363 goes negative. In like manner, if the signal on conductor 361 goes negative, the signal on conductor 363 goes positive. The polarity of the positive and negative signals on the respective conductors is determined by the polarity of the input signal on conductor 124 and the amplitude of the paraphase signals is also determined by the magnitude of the input signal on conductor 124.

The servo drive amplifier 366 comprises two stages of amplification for the signals on conductors 361, 363 respectively, the output thereof being coupled over conductors 370, 371, to the input for the servo bridge circuit 372. Capacitor 367 operates as a filter capacitor for the servo drive amplifier stage 366.

Servo bridge 372 includes four transistors 373, 375, 376, 377, which are connected so that the servo bridge 372 provides signals over conductors 380, 381 to motor 382, the signals being provided to rotate motor 382 selectively in either direction an amount determined by the magnitude of the signals on conductors 370, 371 and in the direction determined by the signal polarity on the respective conductors.

Briefly, with a positive polarity signals on conductor 370 and a negative polarity signal on conductor 371, transistors 373, 377 turn on whereby the collector of transistor 377 goes negative and the emitter of transistor 373 goes positive and the motor is driven in the first direction. With the input conductor 371 positive and input conductor 370 negative, transistors 375, 376 will turn on and the collector of transistor 375 which is connected to conductor 381 goes negative, and the emitter of transistor 376 which is connected to conductor 380 goes positive whereby the motor 382 will rotate in the opposite direction until the signals on conductors 370, 371 return to zero at which time transistors 375, 376 stop conducting.

Capacitors 368, 369 are connected across supply conductors 291, 281 to filter such noise as might be introduced by movement of adjustable potentiometer 383, and capacitors 389, 391 are connected across conductors 380, 381 to reduce high voltage pulses from the motor 382 to prevent damaging of the transistor of bridge servo 372.

The motor 382 in its movement adjusts the ailerons to the indicated positions, and by means of mechanical linkage 129 adjusts the potentiometer 383 to provide a feedback signal over conductor 134 and feedback circuit 136 to the input conductor 120 for operational amplifier 122. As will be set forth in more detail hereinafter, the feedback signal in effect balances the error signal to indicate that the desired aileron adjustment has been effected.

The specific control effected by the circuitry will be set forth hereinafter in an axemplary description of the system in response to a heading change.

Control signal circuitry 8 and elevator control circuitry 9

Figure 7:
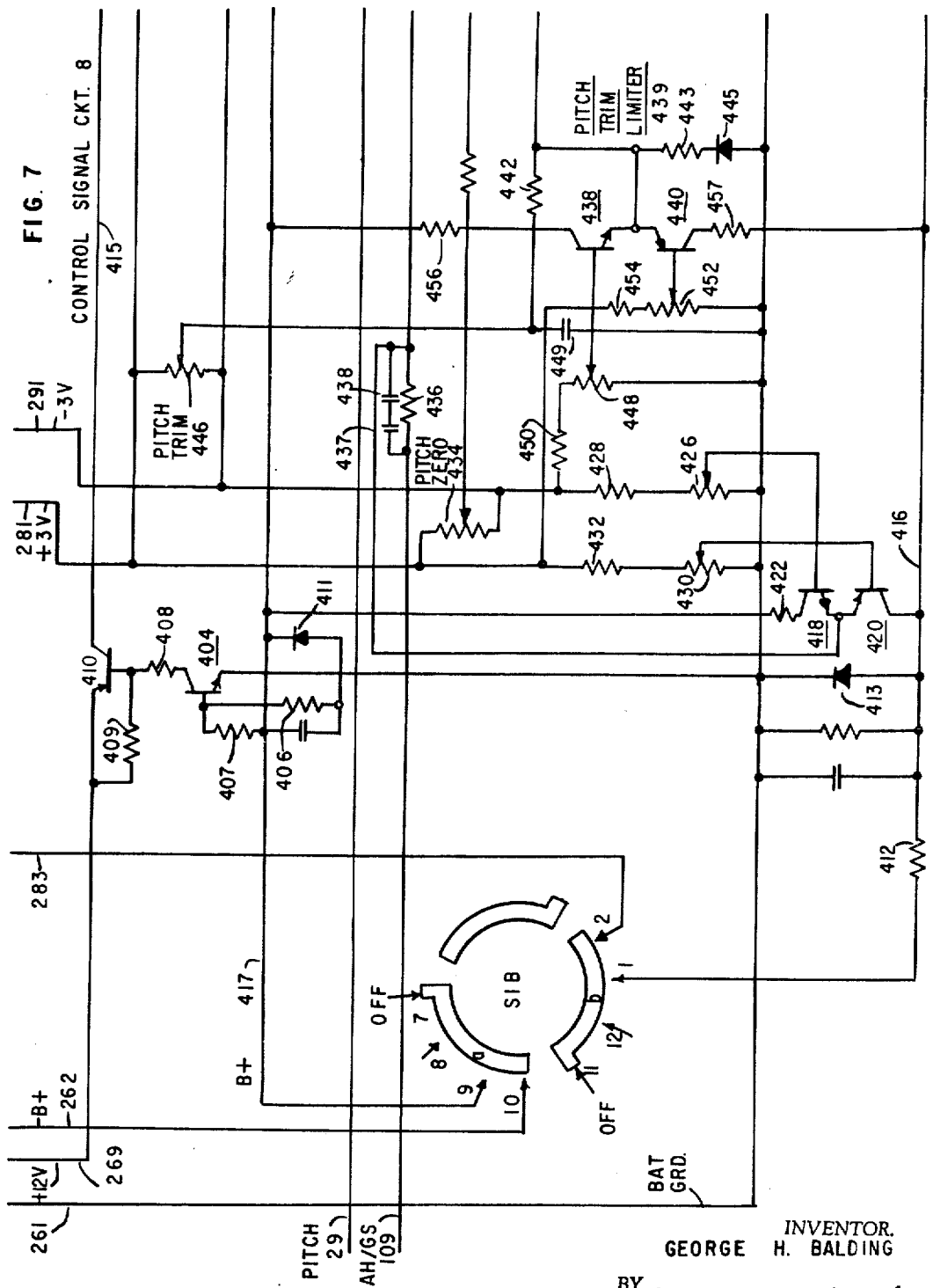
Figure 8:
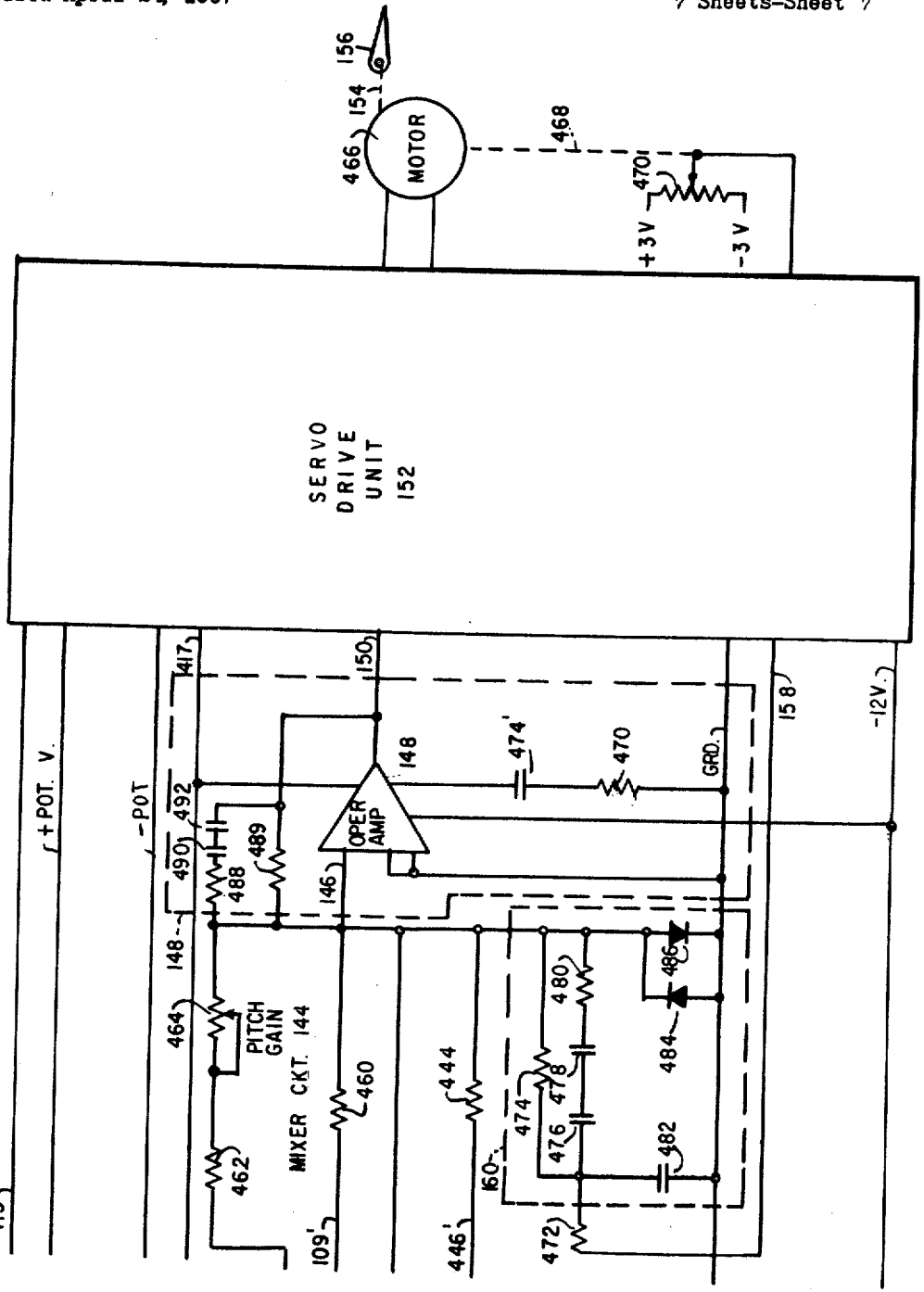

Control signal circuitry 8 and elevator control circuitry 9 are set forth in detail in FIGURES 7 and 8. As there shown the circuitry is powered by +12 volts battery potential over conductor 269, and —12 volts on conductor 262; —12 volts potential on conductor 283; +3 volts volts potential on conductor 281 and a —3 volts potential on conductor 291. Connection of power from conductors 269, 283 to the circuits shown in FIGURES 7 and 8 is effected by deck S1B with movement of switch 163 from the off position to the roll/pitch position. (Contacts 1, 5, 9 closed). Briefly with switch 163 in such position, B+ on conductor 262 is extended over contact 10, segment *a* and contact 9 of desk S1B and the divider circuit comprised of resistors 407, 406 to the base of switching transistor 404. The positive voltage on the base turns on transistor 404.

In that the emitter of transistor 404 is connected to ground and the collector is connected over resistors 408, 409, to +12 volts battery on conductor 269, with conduction of transistor 404 the voltage at the junction of resistors 408, 409 will decrease, and transistor 410 will conduct to extend the +12 volts on conductor 269 to conductor 415 and the servo drive unit 152.

Diodes 411, 413 are connected to protect transistors 404 and 410 in the event B+ and B— are erroneously connected to the circuitry.

Signals representing altitude hold or glide slope conditions depending upon the position of switch 100 (FIGURE 1) are fed over conductor 109' as one input to mixer circuit 144 and signals representing the pitch of the aircraft are fed over conductor 29 to a second input of mixer circuit 144. The values of the input altitude hold/glide slope signals are limited by limiter circuit 140 which basically comprises transistors 418, 420 which have a common emitter circuit connected to the input conductor 109 to maintain the input signals at least than predetermined positive and negative values. Capacitors 437, 438 affect the rate of change of signal waveform in a manner which minimizes oscillation and hunting in the system by leveling off the aircraft as it approaches the selected altitude. The collector of transistor 420 is connected to —12 volt conductor 416 and the collector of transistor 418 is connected via resistor 422 to B+ conductor 417. The base of transistor 418 is connected via resistors 426, 428 to the —3 volt conductor 291, and the base of transistor 420 is connected via adjustable resistor 430 and resistor 432 to the +3 volt conductor 281. The limiter 140 operates in the manner of limiter 114 to limit the altitude hold/glide slope signals on conductor 109' to a predetermined value which in one preferred embodiment was ±3 volts. Adjustable resistors 426, 430 permit adjustment of the limit values provided by the limiter 140.

A pitch trim limiter circuit 439 comprising transistors 438, 440 having their emitters connected common over resistor 444 to the pitch conductor 29 operates in a like manner to limit the value of the pitch input signal to operational amplifier 148. That is, the transistor 438 has its collector connected over resistor 456 to B+ conductor 417 and its base connected via resistors 418, 450 to —3 volts conductor 291, and transistor 440 has its base connected via resistors 452, 454 to +3 volts conductor 281, and its collector connected over resistance 457 to —12 volt conductor 416. The emitter circuits are connected common via resistor 443 and diode 445 to ground. Adjustment of resistors 452 and 448 determines the limiting values established by transistors 438, 440 for the signals on conductor 446, the limiting action occurring in the same manner as set forth in the description of limiter 114. In a preferred embodiment the potentiometers were set to provide a limiting function whenever the signal output over conductor 446 approaches the value which achieves a 500 foot per minute climb or dive by the aircraft.

An external adjustable trim potentiometer 446 is connected between +3 volts and —3 volts potential on conductors 281, 291 to provide a bias voltage over resistor 442 to the common emitter circuit for transistors 438, 440. Adjustment of the pitch trim resistor 446 permits the pilot to adjust the aircraft for zero pitch in the absence of an error signal, which adjustment voltage is further used by the limiter circuit for reference purposes in its limiting operation. A pitch zero trim circuit 434 connected internally of the circuit between +3 volts and —3 volts conductor 281, 291 permits a broad adjustment of the system to account for the difference in component values. The pitch signal gain in the system is adjusted to optimum value by adjustable resistor 464 which is connected in series with resistor 462 and the pitch signal input on conductor 29.

Summarily, the altitude hold/glide slope signals on conductor 109 as limited by limiter 140 are fed over resistor 436, capacitor 437, 438 and resistor 460 in mixer 144 to the output circuit 146, and the pitch signals which appear on conductor 29 are fed over resistor 462, adjustable resistor 464 to the mixer output conductor 146, the final value of which as input to operational amplifier is further determined or altered by the settings on pitch trim potentiometer 446, pitch zero circuit 434, pitch gain resistor 464 and pitch limiter circuit 439 and gain adjusting resistor 489.

Operational amplifier 148 is of the same structure as operational amplifier 122 and operates in the manner thereof to provide signals over path 150 to the servo drive circuitry 152 which is identical to the servo drive unit 126. The RC circuit 474', 476 operates as a high frequency roll-off circuit and the AC circuit 488, 490, 492 operates as a low frequency roll-off circuit with resistor 489 providing a feedback path to operational amplifier 148. The servo drive unit 152 is operative responsive to the DC signals on path 150 to operate motor 466 which via mechanical linkage 154, adjusts the aircraft elevators 156 upwardly and downwardly from a zero reference position. With movement of the aircraft elevators 156 to different positions, motor 466 via mechanical linkage 468 adjusts potentiometer 470 to provide feedback signals over conductor 158 and resistor 472 to feedback circuit 160, the value of the feedback signal indicating the extent of displacement of the elevators, and the polarity indicating the direction of displacement of the elevators from the zero reference position.

The feedback signal on conductor 158 is fed over a series RC circuit 476, 478, 480 which is connected in parallel with resistor 474 to conductor 146 and operational amplifier 148. Capacitors 476, 478 are effective to slow down the feedback loop, and thereby minimize the possibility of overshoot by the motor 466 in adjusting the elevators 156 to a desired position. The manner of operation of such circuitry will be apparent from the foregoing description of the aileron control circuitry 7. Resistor 472 and capacitor 482 are used to filter noise pickup on conductor 158.

OPERATION

With reference now to FIGURES 1-8, a representative example of the manner in which the circuitry operates to provide a video display of information relating to the aircraft condition and the adjustments made in response thereto is now set forth.

With reference first, to FIGURE 1A, there is shown thereat a display of the type which is provided on the monitor 48 when the aircraft is in level flight. That is, with zero displacement about the roll and pitch axes and on a desired heading which in the present example is assumed to be 030 degrees, the horizon line is level and passes through the reticle 49, the ground texture is moving toward the bottom of the display and the apex of the flight path is on the fixed reticle. It is further assumed that the aircraft is in the compass mode (mode switch 84—FIG. 1 adjusted to the compass position) and on altitude hold (GS/AH switch 100—FIG. 1 adjusted to the altitude hold position). The compass hand control 76 is assumed to be set at 030 degrees.

In such mode, pitch sensor 10 (FIG. 1) provides a signal over conductor 24 to the pitch signal demodulator 26 indicating the pitch of the aircraft, and the demodulated DC signal output therefrom is fed over delay circuit 38 and conductor 36 to the horizon generator 34, and over conductor 39 to the ground texture circuit 90 and path vertical delay circuit 50. Horizon generator 34 and ground texture circuit 90 operate in the manner of the above identified copending application to generate waveforms which are supplied over conductors 37 and 41 to mixer 42 for transmission over conductors 44, 46, to the electron beam gun (not shown) of the display tube of display monitor 48. Such signals result in generation of a horizontal line which extends laterally approximately across the middle of the display, and the random space symbols which emanate from the horizon and move toward the bottom of the display at a rate related to the speed of the aircraft. The pitch indicating signal as applied over conductor 39 to the path vertical delay circuit 50 is compared with the altitude hold signal which is provided by altitude hold circuit 20 over conductor 101, signal demodulator 103, conductor 104, altitude hold switch 100, chopper amplifier 106 and conductor 108 to path vertical delay circuit 50. Assuming zero error (i.e., the aircraft at the selected altitude), a zero error signal is fed over path 108 to path delay circuit 50 and the vertical coordinate of the path apex will appear at the fixed reticle 49 on the display monitor 48.

In that we are assuming that the aircraft is on heading 030 which has been selected by the setting of dial 76 on compass hand control unit 74, the signal provided by the directional compass gyro 14 over conductor 72, compass hand control 74, conductor 78 and heading signal demodulator 80, conductor 82, compass position contacts on mode switch 84, conductor 86 to path turn sawtooth generator 88 will be a zero value signal, and as a result path turn sawtooth generator 88 will control path generator 56 to locate the lateral coordinate for the path apex at the fixed reticle 49. The heading error signal on conductor 82 is also sent over conductor 83 to mixer circuit 98 for mixing with the VOR/ILS signal.

The heading error signal on conductor 86 is also fed over conductor 87 to the path heading inversion amplifier 112 in control signal circuitry 6 for amplification and inversion and limiting prior to transmission over conductor 116 for mixing with the roll indicating signal and coupling over conductor 120, operational amplifier 122, conductor 124, servo drive unit 126 for the purpose of adjusting the mechanical linkage 128 in the displacement of the ailerons 130 to the desired position. Since the aircraft is in level flight and on the selected heading the ailerons 130 will be retained in the level position.

The altitude hold signal on conductor 109 is fed over limiter 140 and conductor 142 for mixing with the pitch indicating signal input in the mixer circuit 144. With the aircraft at the desired altitude the resultant error signal will be zero, and with zero error signal fed over conductor 146, operational amplifier 148, path 150 to servo drive unit 152 the elevators will be maintained in the level position.

With the plane in level flight (and controller 162 turned on) any small changes in the roll attitude of the aircraft are provided by gyro compass 10 over roll conductor 25, roll signal modulator 62, path 64 to roll servo 66 and over path 65 to mixer circuit 118. The roll servo 66 adjusts the display to indicate the degree of change on the display. Assuming roll trim potentiometer 353 and roll zero potentiometer 355 and roll command potentiometer 301 are set for level flight, the resultant input signal over control 65 is effective as an error signal to enable control signal circuitry 6 and aileron control circuit 7 to adjust ailerons 130 to effect return of the aircraft to level flight and consequently a display of a level flight condition.

With the aircraft in level flight, any change in the pitch attitude is immediately detected by the attitude gyro 10 and signals over path 24 and pitch signal demodulator 26 to paths 28, 29 display waveform generator 4 to provide a corresponding vertical displacement of the horizon line and ground texture, and the control signal circut 8 and eelvator control circuit 9 are enabled to adjust elevators 156 to return the aircraft to the level flight condition.

The adjustment of the display and aircraft elevators and ailerons will be more fully set forth in the following example wherein the pilot deliberately introduces a large heading change into the heading control to effect a change in the aircraft roll attitude, and a large pitch command into the pitch control circuitry.

Pilot selection of new heading

Assuming now that the pilot selects a new heading of 015 degrees by adjusting the heading selector switch 76 on control 74 to such position, the difference between the actual heading of the aircraft (030 degrees) as provided by directional gyro compass 14 over path 72 to compass hand control 74 output on conductor 78, which is fed over conductor 78 and heading signal demodulator 80 into path 82, the signal being in the order of −1 volt (the value of −1 volt being selected for exemplary purposes), mode switch 84 and conductors 86, 87 to the waveform generator unit 4 and the control signal circuitry 6. The −1 volt error signal as fed over path 80 to the path turn sawtooth generator 88 produces a sawtooth output from generator 88 over path 90 to path generator 56 which provides a waveform output over path 46 and in turn a display on display unit 48 as shown in FIGURE 1B, wherein the apex of the path appears at the left hand margin of the display. The pilot is thus informed that heading 015 is to the left of the present aircraft heading, and that a bank to the left is required to place the plane on the desired heading of 015. Since the aircraft has not as yet been banked, the roll output from the attitude gyro 10 (FIGURE 1) via path 25 and roll signal demodulator circuitry 62 and path 64 to roll servo 66 will remain at zero, and the display, as shown in FIGURE 1B, will be with the horizon in a horizontal position.

The error signal over path 87 in the order of −1 volt is fed to the path heading inverter amplifier 112 (FIGURE 5) including the operational amplifiers 305, 306, 310, 311 and 313. The value of the output signal from transistor 313 is limited by limiter 114 including transistor 325, 326 in the manner described heretofore. The resultant heading signal on conductor 116 is mixed with the roll signal by way of mixer circuit 118 on conductor 65 (which is zero at the present time) and fed to operational amplifier 122, operational amplifier 365, servo driver 366 and servo bridge 372 to adjust the motor 382 to turn the linkage 128 (FIGURE 1B, Step B, Column 4) in a counter-clockwise direction to move the ailerons from the level position to the position wherein the left hand aileron is up and the right hand aileron is down as shown in Column 5. Simultaneously, the adjustable arm on potentiometer 383 is moved to provide a feedback signal output over conductor 134 which increases towards +1 volt (Column 6) as the shaft turns in the counter-clockwise direction. Such signal in fed over resistor 349 (FIGURE 6) and RC network 136 and conductor 353 for mixing with the roll signal on conductor 339, the increasing feedback signal on conductor 353 increasing in the positive direction to balance out the error signal of —1 volt on conductor 339 as input to operational amplifier 122.

As a result of the ailerons being moved to the position illustrated in the chart adjacent FIGURE 1B, Column 5, the aircraft is caused to bank to the left and in such bank the attitude gyro 10 (FIGURE 1) provides a signal over roll conductor 25 to roll signal demodulator 62 which, via path 64, causes roll servo 66 via mechanical linkage 68 to adjust the yoke 20 on the neck of the cathode ray tube, whereby the display begins to rotate in the manner shown in FIGURE 1C to display the banked condition of the aircraft. As the bank continues to increase, the signal over conductor 65 (FIGURE 1) to mixer circuit 118 starts toward +1 volt (FIGURE 1C, Step C, Column 3). At this time, the roll output signal over conductor 65 to mixer circuit 118 (which is approaching +1 volt) and the +1 volt feedback signal (Column 2) being provided by servo drive unit 26 over feedback circuit 134, 136, 138 to mixer circuit 118 together exceed the error signal input (approximately —1 volt) over path 116, and accordingly the positive output signal from mixer circuit 118 over path 120, 122, 124 will control the servo drive unit 126 to adjust the mechanical drive shaft 128 in a clockwise direction (FIGURE 1C, Step D, Column 4), and as the aircraft approaches the desired bank angle, and the shaft 128 is rotated towards its zero position, the feedback signal over the feedback path goes toward zero (Column 6) and the roll input signal +1 volt balances out the error signal —1 volt so that the ailerons are restored to the normal zero reference position (Column 5) while the aircraft is held at the desired bank angle and continues to turn toward the desired heading with the display of FIGURE 1C presented to the pilot.

As the plane approaches within ten degrees of the desired heading of 015 degrees, the error signal output from the compass hand control 74 via path 78, heading signal demodulator 80, path 82 mode switch 84 and paths 86, 87 to control signal circuit 6 (amplifier 112, path 116 and mixer circuit 118, begins to decrease from —1 volt towards zero. The closer the aircraft approaches the desired heading of 015 degrees, the closer the error signal approaches the zero value.

In that the roll input signal provided by the attitude gyro 10 over path 25, roll demodulator 62 and path 65 to mixer circuit 118 is in the order of +1 volt, the changing signal which occurs as the aircraft approaches the desired heading i.e., from —1 volt toward zero, (Step e—Column 2) results in a difference signal which energizes the servo drive unit 126 to operate the mechanical linkage of shaft 128 in a clockwise direction (Column 4) to change the ailerons from the zero position, and the ailerons are moved to the position shown (Step e—Column 5) with the right hand aileron being raised and the left hand aileron being depressed to cause roll of the plane clockwise about its roll axes toward level flight. As the shaft 128 rotates clockwise, the feedback signal over path 134, amplifier 136, path 138 to mixer circuit 118 goes toward —1 volt (Step e—Column 6).

With decreasing roll angle (Step f) the attitude gyro 10 decreases the signal over path 25 to roll demodulator 62 and path 64 to roll servo 66 to decrease the angular displacement of the display about the roll axes. Additionally as the plane approaches the desired heading of 015 degrees, the decreasing error signal output from hand control 74 via path 78, demodulator 80, path 82, mode switch 84, path 86 to the path turn sawtooth generator 88 decreases the amplitude of the sawtooth output therefrom over path 90 to control path generator 56 to adjust the path apex laterally toward the centrally located recitle 49 on the display. As the plane roll angle decreases, the roll signal output from demodulator 62 fed over path 65 to mixer circuit 118 also decreases towards zero (Step b—Column 3) and the amount of aileron displacement required is correspondingly decreased by shaft 128 (Columns 4, 5) and the feedback signal goes toward zero (Column 6).

As the plane roll angle reaches zero (Step g) and the plane is on the selected heading, the error signal output from the compass hand control 74 over the described path to mixer circuit 118 is zero (Column 2), the roll input from the demodulator circuit 62 and path 65 to mixer circuit 118 is zero (Column 3), the shaft 128 is in its normal level flight position (Column 4) the ailerons will be in the normal level position (Column 5) and the feedback signal over path 134, 136, 138 is zero (Column 6). With the plane on heading and in level flight, the display will be that shown in FIGURE 1E, wherein the path apex is located at the centrally located reticle 49 and the horizon line comprises a horizontal line passing through the reticle 49.

PITCH

For purposes of simplicity, the foregoing description was limited to information display and aircraft control which is effected with introduction of a heading change into the system. It will be apparent that with the GS/AH switch 100 in the altitude hold position, the display would simultaneously be varied to indicate displacement of the aircraft from the selected altitude, and thereafter the control by, and effect of, the elevators 156 in their adjustment to return the aircraft to the selected altitude.

Briefly (and without including the concurrent display variations to also show roll variations) with the aircraft at the selected altitude, the signal output from the attitude gyro 10 (FIGURE 1) over conductor 24, pitch signal demodulator 26, path 28, delay circuit 38 and path vertical delay circuit 50 will be zero. The amplitude of the signal provided by altitude hold equipment 20 over path 101, signal demodulator 103, path 104, altitude hold switch 100, chopper amplifier 106 and path 108 to path vertical delay 50 is also zero. As a result the output of the path vertical delay circuit 50 over path 52 to path generator 56 will maintain the vertical coordinate of the apex of the path at the horizon line. If the aircraft is in level flight, the gyro 10 will provide zero output over path 24 and pitch signal demodulator 26 and paths 28, 29 whereby the horizon line is displayed along a horizontal line which passes through the fixed reticle and the elevator are positioned to maintain the aircraft in level flight.

If, now that change in altitude is introduced by the pilot through adjustment of dial 21 to a different setting, the resultant error signal provided by altitude hold circuit 20 over the described circuitry to path vertical delay circuit 50 controls path generator 56 to provide a waveform which results in the path apex being displaced vertically from the horizon line. Assuming, for example, that a higher altitude has been selected, the path will move above the horizon and the system will effect a "pitch-up" attitude to return the aircraft to the desired altitude, and the signal output of the altitude hold circuit 20 over the described circuitry and path 108 will control path vertical delay circuit 50 and path generator circuit 56 to provide a change in the delay circuit to start the path generator earlier in the scan (assuming raster scan from top to bottom) to effect generation of the path apex in a direction toward the upper marginal edge of the display. When the altitude command change is started, the error signal provided by altitude hold circuit 20 is fed over path 109 to limiter 140 in control signal circuit 8. The difference in value between the altitude hold signal input over conductor 109 and the pitch signal input over conductor 29 to mixer circuit 144 (pitch angle having been zero as a result of the aircraft having been at the desired altitude) provides an error signal output over path 146, operational amplifier 148, path 150, control servo drive unit 152 to adjust mechanical linkage on shaft 154 to position the elevator 156 to cause the aircraft to pitch upwardly.

Feedback

As linkage 154 changes the position of elevators 156, the feedback signal over conductor 158, amplifier 160 and path 162' to mixer circuit 144 increases to balance out the error signal received over conductor 109 by reason of the desired change in altitude hold signal.

As the aircraft changes pitch in response to the elevator adjustment, altitude gyro 10 provides signals over path 28 to effect a corresponding change in the vertical location of the horizon line and the path apex on the display 48, and over path 29 to mixer circuit 144 to further balance out the error signal input to the elevator control circuit 9.

As the aircraft returns in the direction of the selected altitude, the error signal output from altitude hold circuit 20 over paths 108, 109 decreases, and the path vertical delay circuit 50 effects return of the path apex in the direction of the horizon line. The reduced signal over path 109 to control signal circuit 8 results in decreasing of the elevator displacement and thereby a decrease in the pitch attitude and the feedback signal to mixer circuit 144. The decreasing pitch attitude results in a reduced pitch signal output over paths 28, 29, whereby the waveform generator 4 controls movement of the horizon line and the path apex upwardly toward the display center; the decreasing pitch signal over path 29 effects further reduction of the elevator angle and the decreasing altitude hold error signal effects return of the path apex toward the horizon line. This integrated control by the several complex loops only briefly outlined in this summary portion continues until the aircraft returns to the selected altitude.

Operation in VOR mode

The system operates in response to receipt of signals from the VOR equipment in a similar manner. In selecting a VOR station, the pilot operates the dial 17 to select a desired station, and additionally operates the dial 76 to select the compass heading to the station. The resultant difference signal between the setting on the compass hand control 74 and the heading of the aircraft provided by compass 14 over path 72 is fed over path 78 and heading signal demodulator 80 and paths 82, 83 for mixing in mixer 98 with the signal output from the VOR equipment 16 and chopper amplifier 94, which signal indicates the desired track to the selected station.

The signal output from mixer 98 is extended over the mode switch 84 in the VOR position to the path turn sawtooth generator 88 and over heading path 87 to control signal circuit 6 which operates to provide control functions in the manner heretofore described with the mode switch in the compass position. In the present arrangement the output of mixer 98 controls the aircraft to cut into the selected VOR track at approximately a 45° angle.

Operation on the glide slope mode

With movement of switch 100 to the glide slope position, glide slope equipment 18 operates in the manner of the altitude hold unit 20 described above to provide error signals indicating the extent of vertical departure from a selected glide slope as determined by the setting on selector switch 19, and the resultant output signals over path 108 are effective in the manner of the altitude hold signals to control the path vertical delay circuit 50 in the vertical adjustment of the path on the display, and the energization of control signal circuit 8 and elevator control circuit 9 to return the aircraft to the selected glide slope.

Operation in the ILS mode

Setting of the mode switch 84 to the ILS position and the simultaneous enablement of the glide slop equipment 18 will enable the system to effect control and display of the aircraft attitudes both vertically and laterally in such manner as to maintain the aircraft on the selected glide slope. In such mode, mixer 98 is operative to provide a reduced angle of cut to the VOR track which is in the order of twenty-two degrees.

Operation in the ADF mode

With the mode switch 84 in the ADF position the ADF equipment 22 provides error signals indicating the displacement of the aircraft from the bearing to an ADF station selected by dial 23 and the system operates in response to such signals to provide display-control functions in the manner set forth heretofore in the matter of the compass operation.

I claim:
1. In a display system for a mobile object having pitch sensor means, pitch control means, video display means, first generator means for providing a command symbol, and a second generator means for providing a pitch symbol for use in indicating pitch of the object on said display means, altitude hold command means for providing a difference signal which repersents the difference between a command altitude and the actual altitude of the object, symbol adjustment means responsive to said difference signal to control said first generator means to adjust said command symbol on said display to represent the change of altitude requested, control signal circuit means controlled by said difference signals to operate said pitch control means for said mobile object to change the pitch of the object, pitch output means connected to said pitch sensor means to provide signals indicating the resultant change of pitch of the object to said control signal circuit means and to said first generator means to effect a corresponding change in position of the pitch symbol on the display means, said altitude hold command means being operative with the resultant change in altitude to provide a correspondingly different output signal to said symbol adjustment means to thereby move the command symbol to idicate the reduced difference in command and actual altitude, and in such continued adjustment, the rate of change toward the desired altitude.

2. A display system as set forth in claim 1 in which said pitch sensor means provides signals to said second generator means as the control signal circuit means reduces the pitch of the object to thereby adjust said pitch symbol on said display means to show the extent of correction being produced by said pitch control means, and as the pitch is reduced, the rate of pitch change in approaching the desired altitude.

3. A display system as set forth in claim 1 in which said pitch output means is also connected to said symbol adjustment means to effect a change in the position of the command symbol with a change in pitch.

4. In a display system for a mobile object having roll sensor means, roll control means, video display means, first generator means for providing a command symbol, and a second generator means for providing a symbol for use in indicating the bank of the object on said display means, heading command means including means for providing a difference signal which repersents the difference between a command heading and the actual heading of the object, symbol adjustment means responsive to said difference signal to adjust said command symbol on said display to repersent the change of heading requested, control signal circuit means controlled by said difference signals to operate said roll control means for said mobile object to change the roll attitude of the object and thereby the heading of the object, roll output means connected to said roll sensor means to adjust at least one of the symbols on said display means to indicate the resultant change in roll attitude of the object, said heading command means being operative with the resultant change in heading to provide a signal of a correspondingly different value to thereby control said symbol adjustment means to move the command cue on the display to indicate the change in the difference in command and actual headings, and to also indicate the rate of change as the object approaches the desired heading, said roll sensor means simultaneously providing signals to said roll output means to control the display to show the degree of roll change effected as an indication of the extent of correction being produced by said roll control means, and means connecting said roll output means to said controll signal means.

5. A display system as set forth in claim 4 in which said heading command means includes VOR equipment having means for selecting a desired track, and means for providing difference signals indicating the difference of the actual heading from the heading for the desired track.

6. In a display system for a mobile object having sensor means, control means for changing the attitude of the object about one axis, video display means, first generator means for providing a command symbol and a second generator means for providing a symbol for use in indicating the attitude of the object about said one axis on said display means, command means including means for providing difference signals which repersent the difference between a command position and the actual position of the object, symbol adjustment means responsive to said difference signals to adjust said command symbol on said display to repersent the change of position requested, control signal circuit means controlled by said difference signals to operate said control means for said mobile object to change the attitude of the object, output means connected to said sensor means to adjust said symbol provided by said second generator means to indicate the resultant change of attitude of the object about said axis, said command means being operative with the resultant change in position to provide a correspondingly different output signal to said symbol adjustment means to thereby move the command symbol to indicate the reduced difference in command and actual position, and in continued adjustment the rate of change toward the desired position.

7. A display system as set forth in claim 6 in which said output means is operative with the changing position of the object to effect adjustment of said symbol on said display means to show the extent of correction being produced by said control means.

8. A display system as set forth in claim in which said command means includes glide slope and ILS equipment for providing signals indicating vertical and lateral displacement from a glide slope to said symbol adjustment means.

9. A display system as set forth in claim 6 in which said command means includes glide slope equipment for providing signals to said symbol adjustment means and said control signal circuit indicating vertical displacement of the object from the selected slope.

10. A display system as set forth in claim 6 in which said command means include VOR equipment for providing signals indicating lateral displacement from a selected track to said symbol adjustment means and said control signal circuit means.

11. In a display system for a mobile object having control means for changing the attitude of the object about its pitch axis, video display means, horizon generator means for providing a horizon line symbol on said display means for use in indicating the attitude of the object about its pitch axis, sensor means for providing signals indicating variation of the actual pitch of the object from a reference pitch condition, output means connected to said sensor means for providing signals with deviation of the object from the desired pitch angle to control said horizon generator means to adjust said symbol to a position on said display which indicates the extent of deviation, and control signal circuit means controlled by said output means to operate said control means to change the pitch attitude of the object in a corrective action, said horizon generator means being responsive to the resultant change in the signals from said output means to effect adjustment of said horizon line symbol on the display to indicate the resultant change of attitude of the object about said axis in the corrective action, and in the continued change of the object pitch, the rate of change toward the reference pitch condition.

12. A display system as set forth in claim 11 which includes controller means for providing a further reference pitch signal to said control signal circuit means, and in which said control signal circuit means is operative to adjust said object to the pitch selected by said controller means.

13. In a display system for a mobile object having control means for changing the attitude of the object about its roll axis, video display means, generator means for providing a symbol on said display means for use in indicating the attitude of the object about said roll axis, sensor means for providing signals indicating deviation of the roll angle of the object from a reference angle, output means connected to said sensor means for adjusting said symbol on said display to indicate deviations from the reference roll angle, and control signal circuit means controlled by said output means to operate said control means for said mobile object to change the roll attitude of the object in a corrective action, said output means being responsive to the resultant change in the sensor signals to adjust said symbol on said display to indicate the extent of attitude change of the object about said roll axis in said corrective action, and in said correction, the rate of change toward the reference roll angle.

14. A display system as set forth in claim 13 which includes controller means for providing a further reference roll signal, and in which said control signal circuit means is operative to adjust the object to the roll angle indicated by said further reference signal.

15. In a display system for a mobile object having control means for changing the attitude of the object about at least one axis, video display means, generator means for providing a symbol on said display means for use in indicating the attitude of the object about said one axis, sensor means for providing signals indicating the actual position of the object about said axis relative to a predetermined reference position, output means responsive to said sensor signals with deviation of the object from the desired position, and control signal circuit means controlled by said output means to operate said control means for said mobile object to change the attitude of the object in a corrective action, said output means being responsive to the resultant change in the sensor signals to effect adjustment of said symbol to indicate the resultant change of attitude of the object about said axis in said corrective action, and in the continued adjustment of symbol position, the rate of change toward the desired position.

16. In a display system as set forth in claim 15 in which said output means includes a signal demodulator circuit including an input circuit connected to receive alternating current signals from said sensor means which vary in phase with variation of the object from said predetermined reference position, a different phase being provided for variation in different directions, and which vary in amplitude by an amount related to the extent of the variation, and means for converting said variable phase, variable amplitude, alternating current signals to direct current signals of different polarities and amplitudes.

17. In a display system as set forth in claim 15 in which said output means includes means for providing a variable phase, variable amplitude, alternating current signals to indicate deviation of said object from a predetermined reference position, and means for adjusting said reference position to different values.

18. In a display system as set forth in claim 17 in which said output means further includes means for converting said alternating current signals to direct current signals of variable polarity and amplitude.

19. In a display system for a mobile object having control means for changing the attitude of the object about at least its pitch and roll axes, video display means including generator means for providing a symbol on said display means for use in indicating the attitude of the object about said pitch and roll axes, sensor means for providing signals indicating deviation of the pitch and roll angles of the object from given reference angles, output means responsive to said sensor signals with deviation of the object from the desired pitch and roll angles to control said video display means to position said symbol display to indicate the deviation from the reference pitch and roll angles, and control signal circuit means controlled by said circuit means to operate said control means for said mobile object to change the pitch and roll attitude of the object as necessary to correct the deviation, said output means being responsive to the resultant change in the sensor signals to effect adjustment of said symbol on said display to indicate the resultant change of attitude of the object about said axes in said corrective action, and in the continued adjustment of the symbol position, the rate of change of the object toward the reference pitch and roll angles.

20. In a display system for a mobile object having control means for changing the attitude of the object about its roll axis, video display means, generator means for providing a symbol on said display means for use in indicating the attitude of the object about said roll axis, sensor means for providing signals indicating deviation of the roll angle of the object from a reference angle, output means connected to said sensor means for adjusting said symbol on said display to indicate deviations from the reference roll angle, heading selection means for providing heading signals representative of a desired heading, and control signal circuit means controlled by said output means and said heading selection means to operate said control means for said mobile object to change the roll attitude of the object to reach the desired heading, said output means being responsive to the resultant change in the object roll attitude to adjust said symbol on said display to indicate the attitude change of the object about said roll axis.

References Cited

UNITED STATES PATENTS

| | | | |
|---|---|---|---|
| 3,037,382 | 6/1962 | Aid et al. | 340—27 XR |
| 3,098,929 | 7/1963 | Kirchner | 235—150.2 |
| 3,117,300 | 1/1964 | Balding | 340—27 |
| 3,118,128 | 1/1964 | Balding | 340—27 |
| 3,418,459 | 12/1968 | Purdy et al. | 235—150.2 |

ALVIN H. WARING, Primary Examiner

U.S. Cl. X.R.

73—178; 235—150.2

PO-1050
(5/69)

UNITED STATES PATENT OFFICE
CERTIFICATE OF CORRECTION

Patent No. 3,497,870  Dated  February 24, 1970

Inventor(s) George H. Balding

It is certified that error appears in the above-identified patent and that said Letters Patent are hereby corrected as shown below:

Column 25, line 45, "claim" should read -- claim 6 --.

Signed and sealed this 20th day of April 1971.

(SEAL)
Attest:

EDWARD M. FLETCHER, JR.　　　　　WILLIAM E. SCHUYLER, JR.
Attesting Officer　　　　　　　　Commissioner of Patents